United States Patent [19]
Fujikawa et al.

[11] Patent Number: 5,859,678
[45] Date of Patent: Jan. 12, 1999

[54] TWO-TERMINAL NONLINEAR ELEMENT AND METHOD FOR FABRICATING THE SAME

[75] Inventors: Yohsuke Fujikawa, Tenri; Yoshihisa Ishimoto, Sakai; Toshiyuki Yoshimizu, Kyoto, all of Japan

[73] Assignee: Sharp Kabushiki Kaisha, Osaka, Japan

[21] Appl. No.: 749,570

[22] Filed: Nov. 15, 1996

[30] Foreign Application Priority Data

Nov. 16, 1995 [JP] Japan ..................................... 7-298750

[51] Int. Cl.⁶ ........................... G02F 1/136; G02F 1/1343
[52] U.S. Cl. ............................................. 349/52; 349/143
[58] Field of Search ................................ 349/49, 50, 51, 349/143, 52, 187; 430/20; 205/122, 123, 135, 124, 171, 189; 257/30, 59, 72; 437/904, 195, 51

[56] References Cited

U.S. PATENT DOCUMENTS

| 4,683,183 | 7/1987 | Ono .................................... 349/52 |
| 5,128,784 | 7/1992 | Suzuki et al. ....................... 349/52 |
| 5,253,092 | 10/1993 | Takahashi ........................... 349/52 |
| 5,596,432 | 1/1997 | Sekiguchi ........................... 349/51 |
| 5,600,458 | 2/1997 | Okano et al. ....................... 349/50 |
| 5,663,020 | 9/1997 | Yamaue et al. ..................... 349/51 |

FOREIGN PATENT DOCUMENTS

| 1-270027 | 10/1989 | Japan . |
| 1-283524 | 11/1989 | Japan . |
| 3-296024 | 12/1991 | Japan . |

*Primary Examiner*—William L. Sikes
*Assistant Examiner*—Tai V. Duong
*Attorney, Agent, or Firm*—Birch, Stewart, Kolasch & Birch, LLP

[57] ABSTRACT

A two-terminal nonlinear element for a liquid crystal display device, which is connected to a corresponding one of pixel electrodes of the liquid crystal display device, includes: a lower electrode connected to a signal line formed on one substrate of the liquid crystal display device; an insulating film formed on a surface of the lower electrode; and an upper electrode formed to face the lower electrode via the insulating film and connected to the corresponding one of the pixel electrodes. The insulating film has a first portion interposed between the upper electrode and the lower electrode and a second portion surrounding the upper electrode and having a thickness larger than that of the first portion, and the first and second portions of the insulating film are made of a same metal oxide produced by anodization.

9 Claims, 18 Drawing Sheets

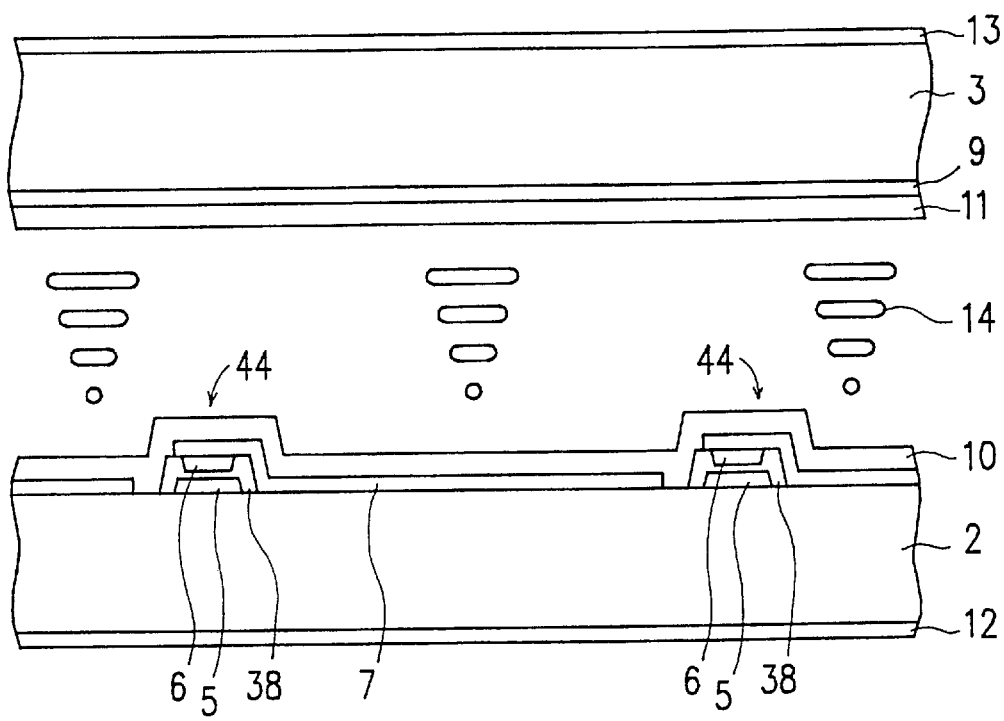

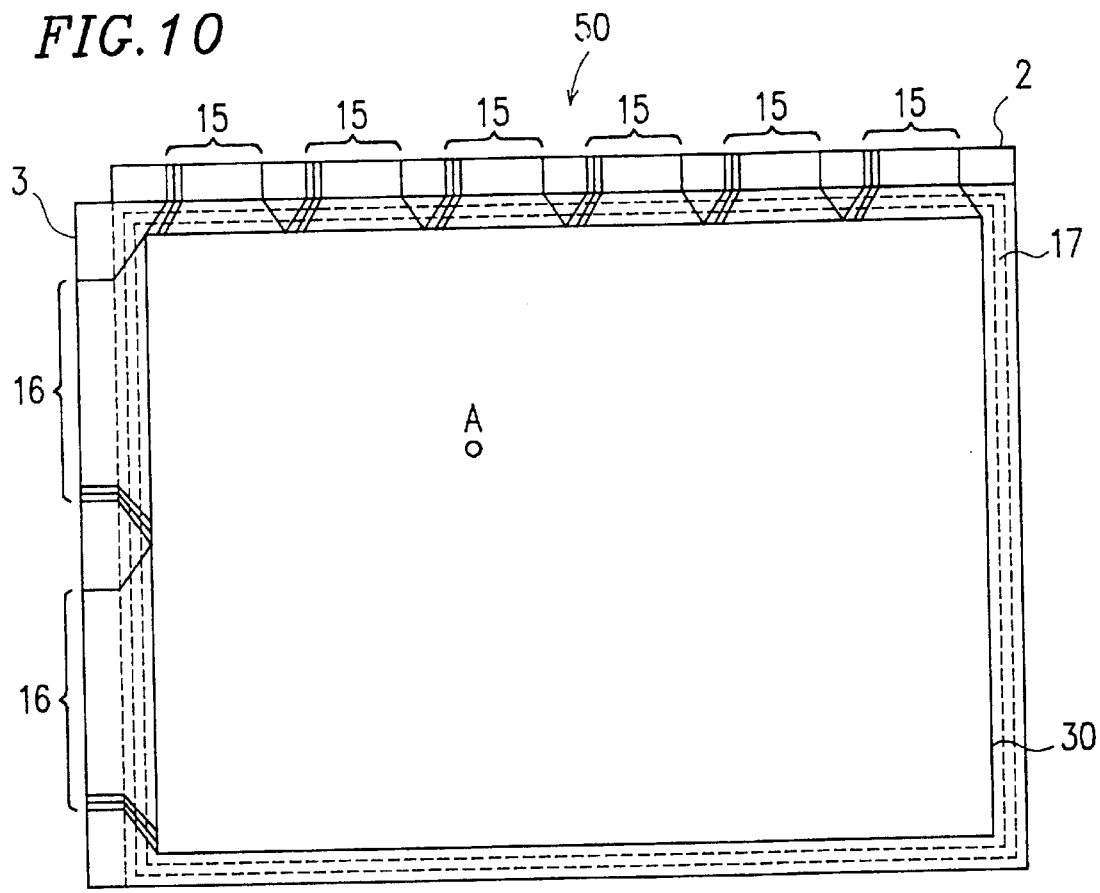

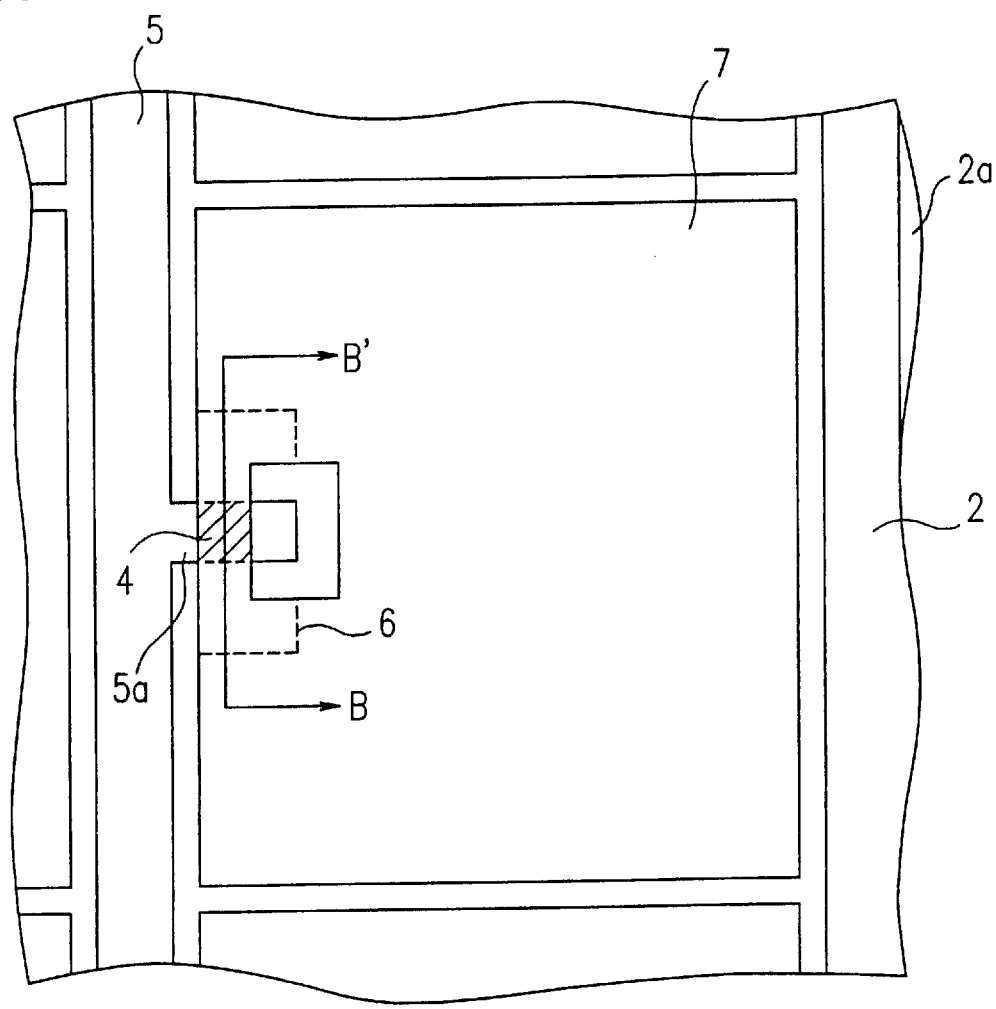

TWO-TERMINAL NONLINEAR ELEMENT AND METHOD FOR FABRICATING THE SAME

BACKGROUND OF THE INVENTION

1. Field of the Invention

The present invention relates to a two-terminal nonlinear element used for a liquid crystal display device, and a method for fabricating the same. More particularly, the present invention relates to a two-terminal nonlinear element having a layered structure of metal-insulator-metal (MIM structure), and a method for fabricating the same.

2. Description of the Related Art

In recent years, liquid crystal display devices having the features of being thin, lightweight and having low power consumption have been used as display devices for personal computers, wordprocessors, terminals of office automation systems, TV sets, and the like. In these applications, demands for further increasing the capacity and enhancing the image quality of the display have increased.

Conventional liquid crystal display devices generally adopt a single matrix driving method in a TN (twisted nematic) mode or STN (super twisted nematic) mode, such as an averaged voltage driving method. In this method, however, the contrast ratio of the display lowers as the number of scanning lines increases. This method is therefore inappropriate for large-capacity display.

To overcome the above problem, an active matrix driving method has been developed where switching elements are provided for individual pixels constituting a display screen. Thin film transistors or two-terminal nonlinear elements are used as the switching elements for the active matrix driving method. In particular, liquid crystal display devices using two-terminal nonlinear elements as the switching elements are promising because the structure is simple and the production cost is low. Among other types of the two-terminal nonlinear elements, MIM elements having an MIM (metal-insulator-metal) structure have already been commercialized.

The MIM element has nonlinear voltage/current characteristics, where the resistance of the element becomes high when the voltage of an input signal applied to the element is low, and becomes low when the voltage of the input signal is high enough to drive the pixel. The liquid crystal display devices provided with such MIM elements utilize the nonlinear voltage/current characteristics of the MIM elements for on/off switching.

FIG. 10 is a plan view of a liquid crystal display device 50 using conventional MIM elements.

In FIG. 10, a substrate 2, on which MIM elements and signal line terminals 15 connected to the MIM elements are formed (hereinbelow, such a substrate is referred to as a "device-formed substrate"), is located on the back side, and a substrate 3, on which counter electrodes and counter terminals 16 connected to the counter electrodes are formed (hereinbelow, such a substrate is referred to as a "counter substrate"), is located on the front side of the liquid crystal display device 50. The device-formed substrate 2 and the counter substrate 3, which are typically made of glass, are attached to each other with a sealing material 17 interposed therebetween.

The liquid crystal display device 50 is a reflection type monochromatic display device having a so-called H-VGA pixel arrangement of 480 dots (H)×320 dots (V).

FIG. 11 is a plan view of one pixel formed on the device-formed substrate 2 at an arbitrary position A in a display region 30 of the liquid crystal display device 50 shown in FIG. 10. FIG. 12 is a plan view of the portion of the counter substrate 3 corresponding to the portion of the device-formed substrate 2 shown in FIG. 11. FIG. 13 is a sectional view of the liquid crystal display device 50, taken along line B–B' of FIG. 11.

As shown in FIG. 11, each pixel includes a pixel electrode 7, a signal line 5, and an MIM element 4 formed on a surface 2a of the device-formed substrate 2. A plurality of such signal lines 5 are actually disposed on the device-formed substrate 2 in parallel with each other, and connected to the respective signal line terminals 15 (see FIG. 10) formed at an end of the device-formed substrate 2.

As shown in FIG. 12, a plurality of counter electrodes 9 are formed on a surface 3a of the counter substrate 3 in a stripe shape in a direction perpendicular to the signal lines 5. The counter electrodes 9 are connected to the respective counter terminals 16 (see FIG. 10) formed at an end of the counter substrate 3. The liquid crystal display device having the pixels with the above configuration is driven by applying signals having waveforms, which are determined in accordance with an image to be displayed, to the signal line terminals 15 and the counter terminals 16.

Referring to FIG. 13, each MIM element 4, which is shown as a hatched portion in FIG. 11, is a two-terminal nonlinear element Including a lower electrode 5a as an extension of the signal line 5, an insulating film B formed to cover the lower electrode 5a, and an upper electrode 6 facing the lower electrode 5a via the insulating film 8.

The lower electrode 5a is made of tantalum (Ta), for example, and the upper electrode 6 is made of titanium (Ti), aluminum (Al), or chromium (Cr). The insulating film 8 is made of tantalum oxide ($TaO_x$), for example.

Referring to FIGS. 14A to 14E, the fabrication process of the MIM element 4 having the sectional structure as shown in FIG. 13 will be described.

A Ta thin firm is first formed on the surface 2a of the device-formed substrate 2 made of glass by sputtering. The Ta thin film is then patterned into a predetermined shape by photolithography to form the signal lines 5 and the lower electrodes 5a. In FIG. 14A, only one lower electrode 5a formed on the surface 2a of the device-formed substrate 2 is shown.

As shown in FIG. 14B, the insulating film 8 made of $TaO_x$ is then formed to cover the patterned signal lines 5 and lower electrodes 5a made of the Ta thin film by anodizing the Ta thin film, for example.

Thereafter, as shown in FIG. 14C, for the formation of the upper electrodes 6, a Ti thin film 6a, for example, is formed on the device-formed substrate 2 covering the lower electrodes 5a and the insulating films 8. A resist 18 made of a photosensitive resin having a shape corresponding to the pattern of the upper electrodes 6 to be formed is applied to the Ti thin film 6a, exposed to light, and developed.

The Ti thin film 6a is then etched to remove the portions thereof which are not covered with the resist 18. The resist 18 is subsequently removed to obtain the upper electrodes 6 having the predetermined shape as shown in FIG. 14D.

A thin film (not shown) made of a transparent conductive material such as ITO (indium tin oxide) is then formed on the resultant substrate covering the upper electrodes 6. The ITO thin film is then patterned into a predetermined shape by photolithography to form the pixel electrodes 7 as shown in FIG. 14E. The pixel electrodes 7 are connected to the upper electrodes 6.

Thus, the MIM elements 4 each having the upper electrode 6 and the lower electrode 5a vertically facing each other via the insulating film 8 are formed.

In the above fabrication process of the MIM elements 4, a total of three photomasks are required to pattern the components into the respective predetermined shapes. These three photomasks are: the photomask used to form the lower electrodes 5a by patterning the Ta thin film; the photomask used to form the upper electrodes 6 by patterning the Ti thin film 6a; and the photomask used to form the pixel electrodes 7 by patterning the ITO film.

Referring back to FIG. 13, an alignment film 10 made of polyimide or the like is formed over the device-formed substrate 2 made of glass with the MIM elements 4 formed thereon, and rubbed in a first direction. Likewise, an alignment film 11 is formed on the counter substrate 3 made of glass with the counter electrodes formed thereon, and rubbed in a second direction which is twisted by 90°, for example, from the first rubbing direction of the alignment film 10 on the device-formed substrate 2. The formation and rubbing of the alignment films 10 and 11 are performed to control the orientation of liquid crystal molecules in the liquid crystal layer 14 to be injected in a space between the substrates 2 and 3 after these substrates are attached to each other.

The device-formed substrate 2 and the counter substrate 3 are disposed so that the alignment films 10 and 11 formed thereon face each other, and are attached to each other via the sealing material 17 (see FIG. 10) so that the gap therebetween is kept at about 10 µm. The liquid crystal material is injected in the space between the device-formed substrate 2 and the counter substrate 3 to form a liquid crystal layer 14. Then, the substrates 2 and 3 are sealed to form a liquid crystal cell. Polarizing plates 12 and 13 are disposed on the outer surfaces of the liquid crystal cell, so that the polarizing axes of the polarizing plates 12 and 13 are displaced from each other by 90°. Thus, the liquid crystal display device 50 having the MIM elements 4 for the respective pixels is obtained.

Since the liquid crystal display device 50 is of the reflection type, the polarizing plate 12 disposed on the device-formed substrate 2 is provided with a reflector. Alternatively, a transmission type liquid crystal display device can be obtained by using a transmissive polarizing plate and a backlight. A color display is also possible by forming color microfilters of the counter substrate 3.

The above conventional reflection type liquid crystal display device 50 displays images by reflecting light incident from outside the device. With no backlight required, a thin and lightweight liquid crystal display device with low power consumption can be realized. This type of liquid crystal display device is therefore expected to be commercialized as a display for a portable information terminal, for example. To realize such a display, a reflection type liquid crystal display device with high resolution and large capacity and capable of providing so-called paper-white bright display is required.

However, the reflection type liquid crystal display device is disadvantageous in that, since incident light is partially absorbed by the polarizing plate, the reflectance is normally only 50% or less and thus the brightness is not satisfactory.

To overcome the above disadvantage, there is proposed a liquid crystal display device which has no polarizing plate to effectively use all the incident light. One example of such a liquid crystal display device is a phase transition guest-host type liquid crystal display device.

FIG. 15 is a plan view of a device-formed substrate 2 of a liquid crystal display device 70 of the phase transition guest-host type; FIG. 16 is a plan view of a counter substrate 3 of the liquid crystal display device 70; and FIG. 17 is a sectional view of the liquid crystal display device 70, taken along line C–C', of FIG. 15.

The liquid crystal display device 70 has the HVGA pixel arrangement and the plan view of the liquid crystal display device 70 is basically the same as that of the liquid crystal display device 50 shown in FIG. 10. The description thereof is therefore omitted here. The components of the liquid crystal display device 70 corresponding to those of the liquid crystal display device 50 shown in FIGS. 10 to 14E are denoted by the same reference numerals, and the detailed descriptions thereof are omitted here.

As shown in FIG. 17, the liquid crystal display device 70 has color microfilters 22 formed on the counter substrate 3. Each color microfilter 22 is composed of a cyan microfilter 22a and a red microfilter 22b each of which corresponds to one picture element. Therefore, two picture elements, one for the cyan microfilter 22a and one for the red microfilter 22b, constitute one pixel. Therefore, the number of signal line terminals 15 required for this device is double the number of pixels. Specifically, for a 480 dot display, a total of 960 signal line terminals 15 are disposed on the device-formed substrate 2.

Further, in the liquid crystal display device 70, each pixel electrode 7 serves as a reflector. In other words, the liquid crystal display device 70 has a reflector formed inside the liquid crystal cell, not on the outer surface of the liquid crystal cell as in the liquid crystal display device 50 described above. Aluminum may be used as the material of the pixel electrodes 7 which serve as the reflectors.

In the liquid crystal display device 70, the pixel electrodes 7 are formed on an organic insulating layer 23, unlike the liquid crystal display device 50. As shown in FIG. 17, the surfaces of the portions of the organic insulating layer 23 on which the pixel electrodes 7 are to be formed are made uneven (in FIG. 15, such uneven portions are shown by large and small solid circles). The uneven surfaces of the insulating layer 23 a effects the pixel electrodes 7 which are disposed on the insulating layer 23, making the surfaces of the pixel electrodes 7 uneven. These uneven surfaces of the pixel electrodes 7 serve as light-diffusing and reflective surfaces with high reflectance, which effectively improve the brightness and contrast of the resultant liquid crystal display device. The upper electrodes 6 of the MIM elements and the pixel electrodes 7 are electrically connected via contact holes 19 formed through the organic insulating layer 23.

As shown in FIG. 17, a guest-host liquid crystal layer 40 containing liquid crystal molecules 20 and dichromatic dye molecules 21 is formed between the device-formed substrate 2 and the counter substrate 3. The on/off functionality of the display is performed by applying a voltage across the pixel electrodes 7 formed on the device-formed substrate 2 and the counter electrodes 9 formed on the counter substrate 3 to control the orientations of the liquid crystal molecules 20 and the dichromatic dye molecules 21 contained in the guest-host liquid crystal layer 40.

More specifically, the dichromatic dye molecules 21 orient themselves along the liquid crystal molecules 20. When a voltage is applied, therefore, the liquid crystal molecules 20 and the dichromatic dye molecules 21 orient themselves in a direction substantially perpendicular to the surfaces of the substrates 2 and 3. This allows light incident on the counter substrate 3 to pass through the guest-host liquid crystal layer 40 without being absorbed by the dichromatic dye molecules 21. The light is then reflected by the pixel electrodes 7 serving as reflectors, passes again through the liquid crystal layer 40, and is output from the counter substrate 3.

On the contrary, when no voltage is applied, the liquid crystal molecules 20 and the dichromatic dye molecules 21 are arranged randomly in the liquid crystal layer 40. The incident light is therefore blocked by being absorbed by the dichromatic dye molecules 21.

Thus, a bright display (white display) is obtained when incident light is reflected, while a dark display (black display) is obtained when incident light is blocked. Since no polarizing plate is used, a bright display screen is obtained.

The above conventional liquid crystal display devices have the following disadvantages. The insulating film 8 within each MIM element 4 is as thin as 500 to 700 Å. Since the withstanding voltage of such a thin insulating film is low, breakdown can easily occur due to static electricity generated during the fabrication process. Once such breakdown occurs, the upper electrode 6 and the lower electrode 5a of the MIM element 4 are short-circuited, making the MIM element 4 inoperative as a switching element. The pixel corresponding to such a defective MIM element 4 manifests itself as a point defect, thereby lowering the display quality. If such a defect occurs often, the production yield of the liquid crystal display device decreases undesirably.

In particular, in liquid crystal display devices used as portable information terminals which require high resolution and large capacity, the number of pixels and thus the number of MIM elements to be formed is huge. Further, in the color display, the number of MIM elements to be formed is larger than that required for the monochromatic display with the same number of pixels since, in the color display, each pixel is composed of a plurality of picture elements corresponding to respective color microfilters. Moreover, with the color microfilters, point defeats are colored, making them more conspicuous and thus further lowering the quality of the displayed images. It is therefore important to suppress such point defects.

To prevent the generation of static electricity which is a cause of point defects, various types of environmental control are performed during the fabrication process of liquid crystal display devices, including thorough control of humidity in the fabrication process, grounding of workers, and installation of an ion shower. However, the breakdown of MIM elements due to the generation of static electricity has not been completely eliminated.

To overcome the above problem, improving the resistance of the MIM elements has also been examined.

In the conventional MIM element, not only the portion of the insulating film formed on the top flat surface of the lower electrode, but also the peripheral portion thereof formed on the periphery of the lower electrode are used to constitute the MIM element. Such a peripheral portion of the insulating film tends to intensively receive the electric field. Also, the insulating film may fail to cover the periphery of the lower electrode completely due to its insufficient step coverage. Due to these reasons, the breakdown of the insulating film may easily occur at the periphery of the lower electrode, making the MIM element inoperative.

To overcome the above problem, the peripheral portion of the insulating film may be covered with an intermediate insulating layer. With this additional formation of the insulating layer, only the portion of the insulating film formed on the top flat surface of the lower electrode is used to constitute the MIM element, so that the possibility of insulation breakdown of the MIM element can be reduced. Such a MIM element is disclosed in Japanese Laid-Open Patent Publication Nos. 1-270027, 1-283524, and 3-296024, for example. The MIM elements disclosed in these publications are all formed by forming a lower electrode, an insulating film, an intermediate insulating layer, and an upper electrode in that order. Alternatively, the intermediate insulating layer may be formed prior to the formation of the insulating film.

The insulating film and the intermediate insulating layer may be made of the same material or different materials. When they are made of different materials, impurities may enter the insulating film from the intermediate insulating layer, resulting in a degradation of the MIM element.

When the insulating film which constitutes the MIM element and the intermediate insulating layer are made of different materials or formed in different processes, the adhesion between the intermediate insulating layer and the underlying film decreases, which may cause a peeling of the intermediate insulating layer from the underlying film. For example, when an $SiO_2$ film is formed as the intermediate insulating layer on the periphery of the lower electrode made of Ta, and then the insulating film is formed on the top flat surface of the lower electrode by anodic oxidation, the previously-formed $SiO_2$ intermediate insulating layer may peel off partially. This makes it difficult to form the complete intermediate insulating layer as a protection film.

Accordingly, the intermediate insulating layer is preferably formed after the formation of the insulating film. Also, the insulating film and the intermediate insulating layer are preferably made of the same material.

However, when the intermediate insulating layer is formed after the formation of the insulating film, the characteristics of the already-formed insulating film may be degraded if a high temperature is used in the formation of the intermediate insulating layer. This results in degrading the characteristics of the resultant MIM element. More specifically, the intermediate insulating layer made of an oxide or a nitride is generally formed by plasma CVD or reactive sputtering. These film formation techniques generally involve a heating process requiring a comparatively high temperature of about 300° C. Such a high temperature degrades the characteristics of the already-formed insulating film and thus adversely affects the resultant MIM element, causing abnormalities in the characteristics of the MIM element.

FIG. 18 is a graph showing an example of the degradation in the characteristics of an MIM element due to heating. In other words, how the baking temperature, which is performed later than the formation of the insulating layer of the MIM element, influences the voltage/current characteristics of the resultant two terminal nonlinear element is shown. In this graph, curves 1–4 shows the characteristics of the MIM element due to heating when the MIM element was baked at different temperatures after the formation of the upper electrode. Curve 5 shows the characteristics of the MIM element obtained when the baking treatment was not performed.

In general, the voltage/current characteristics of a two-terminal nonlinear element conforms to the Poole-Frenkel current represented by equation (1) below:

$$\ln (I/V) = \ln A + B\sqrt{V} \tag{1}$$

wherein I denotes the current and V denotes the voltage. Coefficient A denotes the electric conductivity of the MIM element and Coefficient B denotes the nonlinearity of the resistance of the MIM element. As coefficient A increases, the resistance of the MIM element is smaller and as coefficient B increases, the steepness of the voltage/current characteristics at and around the threshold voltage is larger, allowing the resultant liquid crystal display device to obtain high contrast. That is, it is desirable to increase coefficient B to enhance the image sharpness.

As shown in FIG. 18, however, coefficient B becomes small when the MIM element is baked after the formation thereof, and further decreases as the baking temperature increases. This decrease in coefficient B is undesirable in the characteristics of the MIM element.

It is preferable, therefore, to form the intermediate insulating layer at a temperature as low as possible. This formation of the intermediate insulating layer at a low temperature is also required when a plastic material having a low heat resistance is used as the substrate.

SUMMARY OF THE INVENTION

According to an aspect of the present invention, a two-terminal nonlinear element for a liquid crystal display device is provided. The liquid crystal display device includes: a pair of substrates facing each other; a liquid crystal layer interposed between the pair of substrates; and a plurality of pixel electrodes formed in a matrix on a surface of at least one of the substrates so as to face the other substrate. The two terminal nonlinear element is connected to a corresponding one of the plurality of pixel electrodes and includes: a lower electrode connected to a signal line formed on the at least one of the substrates; an insulating film formed on a surface of the lower electrode; and an upper electrode formed to face the lower electrode via the insulating film and connected to the corresponding one of the plurality of pixel electrodes. The insulating film has a first portion interposed between the upper electrode and the lower electrode and a second portion surrounding the upper electrode and having a thickness larger than that of the first portion. The first and second portions of the insulating film are made of a same metal oxide produced by anodization.

In one embodiment of the invention, a portion of the signal line serves as the lower electrode, and the two-terminal nonlinear element is formed directly on the signal line.

In another embodiment of the invention, the insulating film having the first and second portions is formed by a plurality of anodization steps.

According to another aspect of the invention, a method for fabricating a two-terminal nonlinear element, which includes a lower electrode, an insulating film formed covering the lower electrode, and an upper electrode formed to face the lower electrode via the insulating film, is provided. The method includes the steps of: forming a first conductive film on a substrate and then patterning the first conductive film to form the lower electrode; performing a first anodization to form the insulating film on at least a portion of the lower electrode; forming a second conductive film on the insulating film; forming a photosensitive resin layer having a pattern corresponding to a pattern of the upper electrode on the second conductive film; patterning the second conductive film into a predetermined shape using the photosensitive resin layer to form the upper electrode; performing a second anodization using the pattern of the photosensitive resin layer remaining on the upper electrode, to thicken a portion of the insulating film corresponding to a portion surrounding the upper electrode more than a portion of the insulating film interposed between the upper electrode and the lower electrode; and removing the photosensitive resin layer.

According to still another aspect of the invention, a two-terminal nonlinear element includes: a lower electrode having a top flat portion; an insulating layer formed covering the lower electrode; an upper electrode formed to partially overlap the lower electrode with the insulating layer interposed therebetween. The thickness of the insulating layer is thinner in a portion located on the top flat portion of the lower electrode than in a portion located on a portion of the lower electrode other than the top flat portion.

Thus, the invention described herein makes possible the advantages of (1) providing a two-terminal nonlinear element for a liquid crystal display device where an MIM structure including an insulating film formed on a top flat surface of a lower electrode is formed at low temperature, thereby preventing degradation in the characteristics of the element and thus minimizing defects in the element, and (2) providing a method for fabricating such a two-terminal nonlinear element.

These and other advantages of the present invention will become apparent to those skilled in the art upon reading and understanding the following detailed description with reference to the accompanying figures.

BRIEF DESCRIPTION OF THE DRAWINGS

FIG. 8 is a sectional view taken along line F–F' of FIG. 6.

FIG. 10 is a plan view of a conventional liquid crystal display device.

FIG. 11 is a plan view of a device-formed substrate on which a conventional two-terminal nonlinear element is formed.

DESCRIPTION OF THE PREFERRED EMBODIMENTS

(EXAMPLE 1)

A liquid crystal display device 100 including two-terminal nonlinear elements of Example 1 according to the present invention will be described with reference to FIGS. 1 to 53.

The liquid crystal display device 100 is a phase transition guest-host type liquid crystal display device which has an H-VGA pixel arrangement and is provided with color microfilters, wherein each color microfilter is composed of a cyan microfilter and a red microfilter to effect multicolor display.

Figure 1:
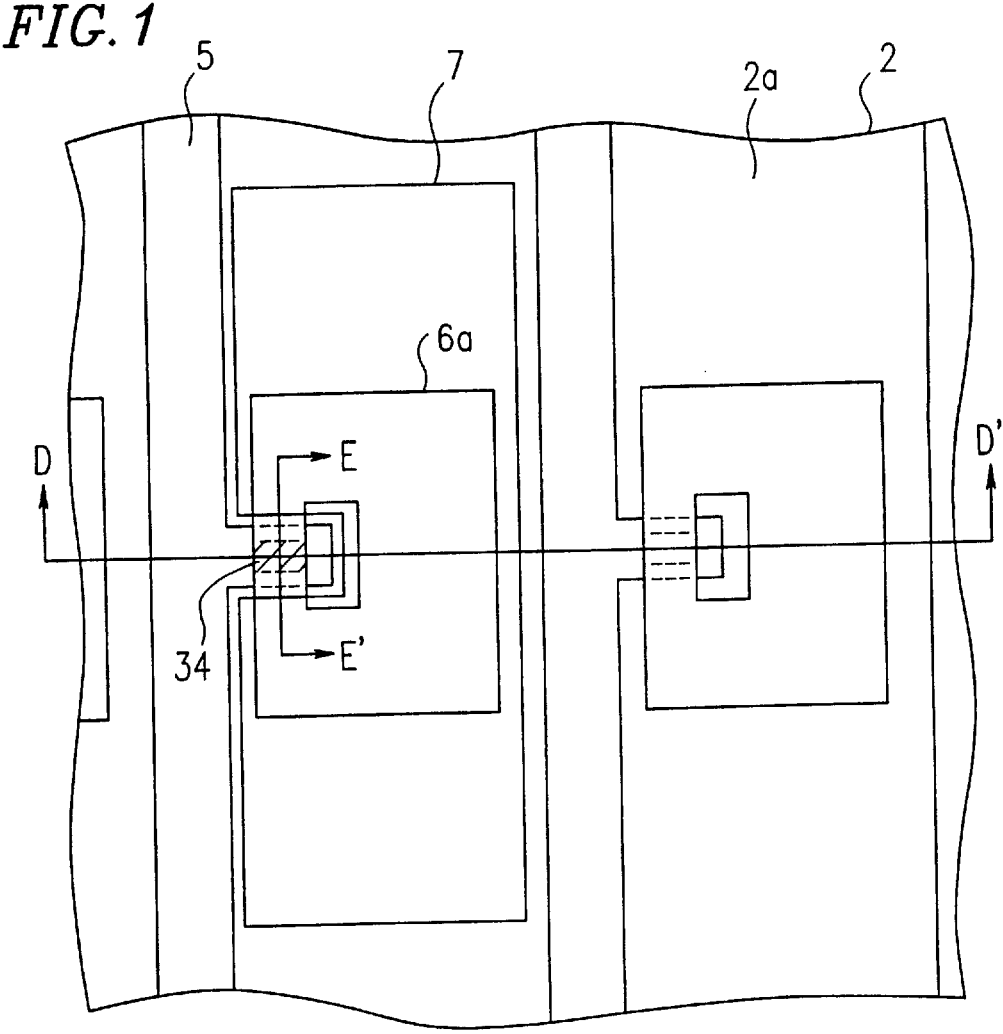
FIG. 1 is a plan view of a device-formed substrate on which a two-terminal nonlinear element of Example 1 according to the present invention is formed.
Figure 2:
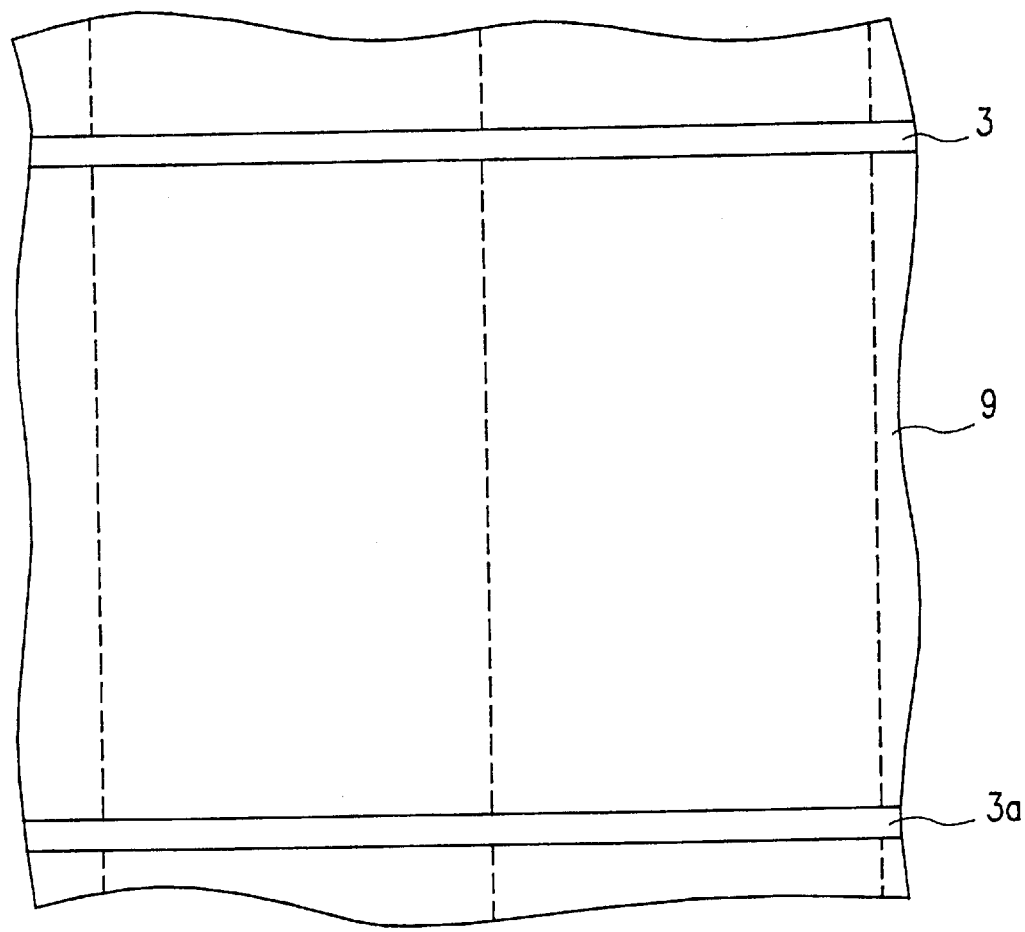
FIG. 2 is a plan view of a counter substrate facing the device-formed substrate of FIG. 1.
Figure 3:
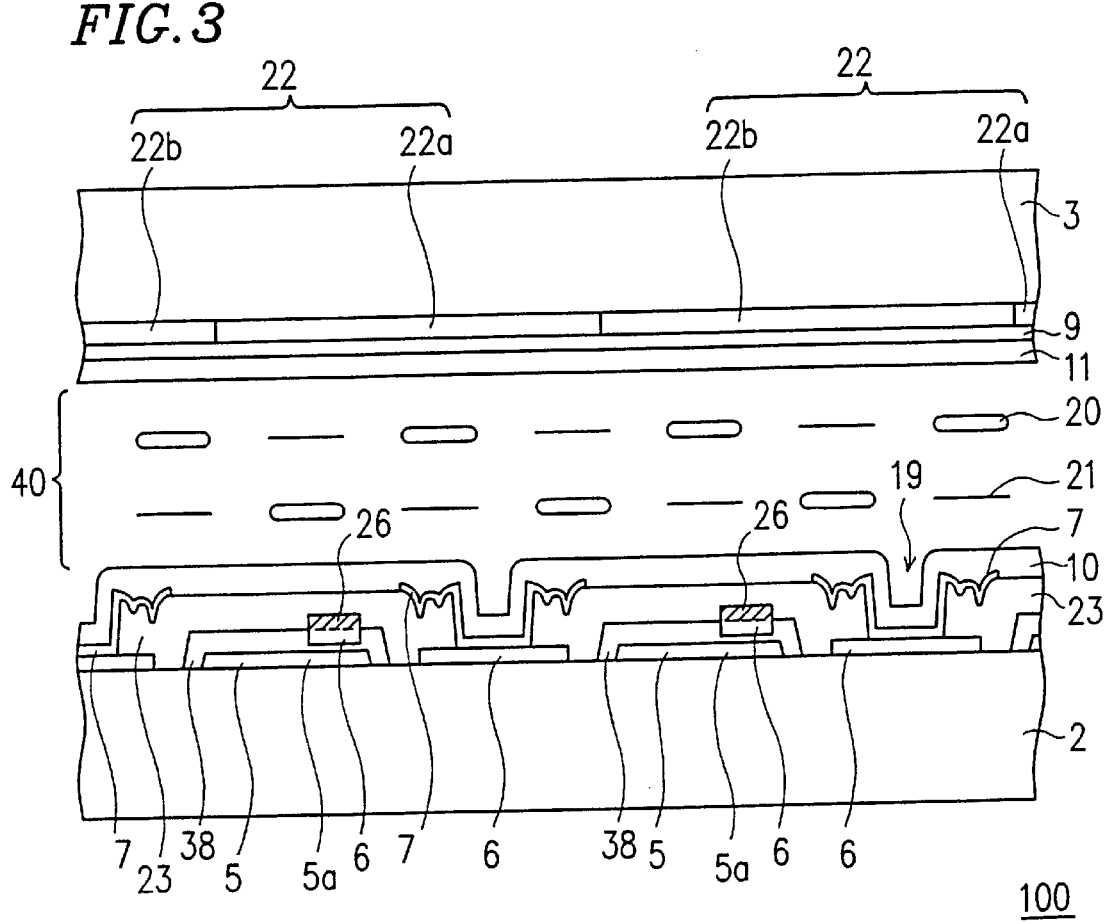
FIG. 3 is a sectional view taken along line D–L of FIG. 1.

FIG. 1 is a plan view of one pixel formed on a device-formed substrate 2 at an arbitrary position in a display region of the liquid crystal display device 100. FIG. 2 is a plan view of the portion of a counter substrate 3 corresponding to the portion of the device-formed substrate 2 shown in FIG. 1. FIG. 3 is a sectional view of the liquid crystal display device 100, taken along line D–D' of FIG. 1. The plan view of the liquid crystal display device 100 is basically the same as that of the conventional liquid crystal display device 50 shown in FIG. 10. The description thereof is therefore omitted here. The components of the liquid crystal display device 100 corresponding to those of the conventional liquid crystal display devices 50 and 70 shown in FIGS. 10 to 17 are denoted by the same reference numerals.

Figure 15:
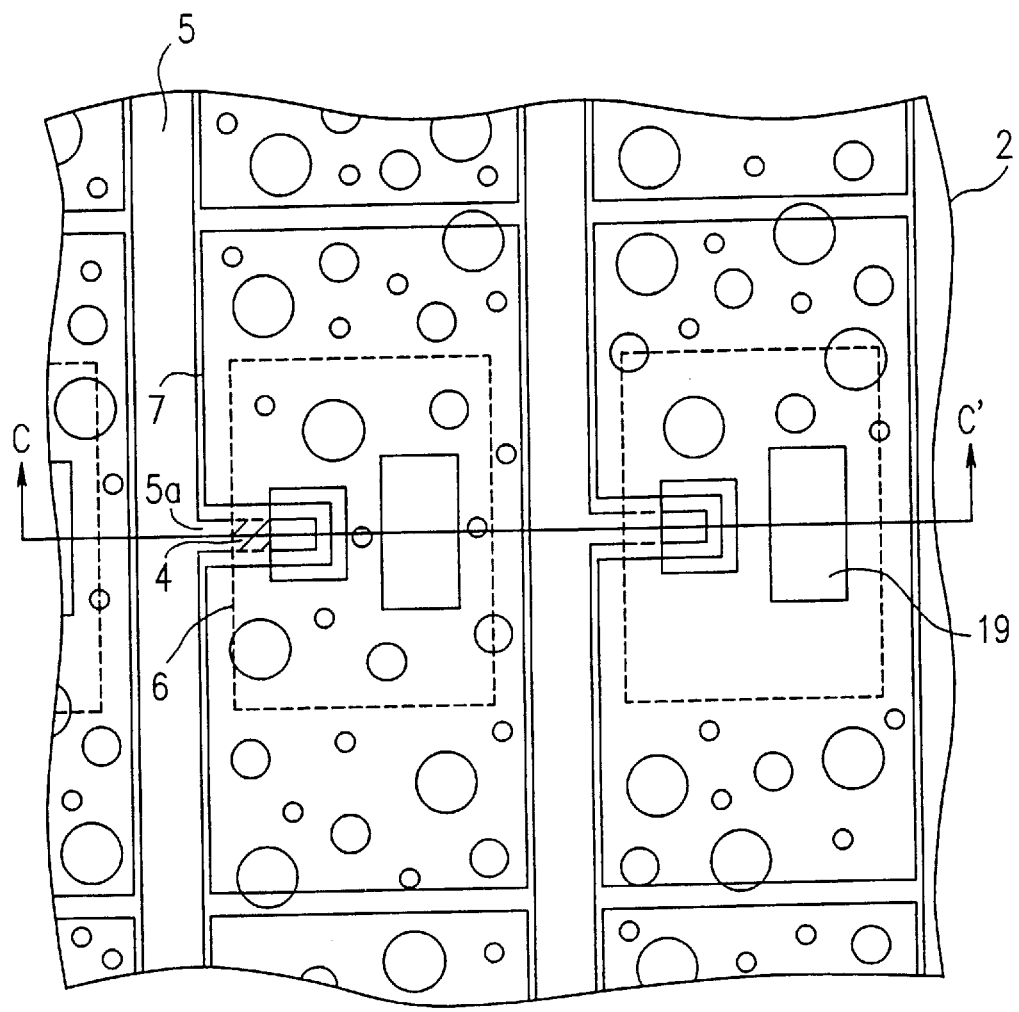
FIG. 15 is a plan view of a device-formed substrate of a conventional liquid crystal display device where a reflector is formed inside a liquid crystal cell.
Figure 16:
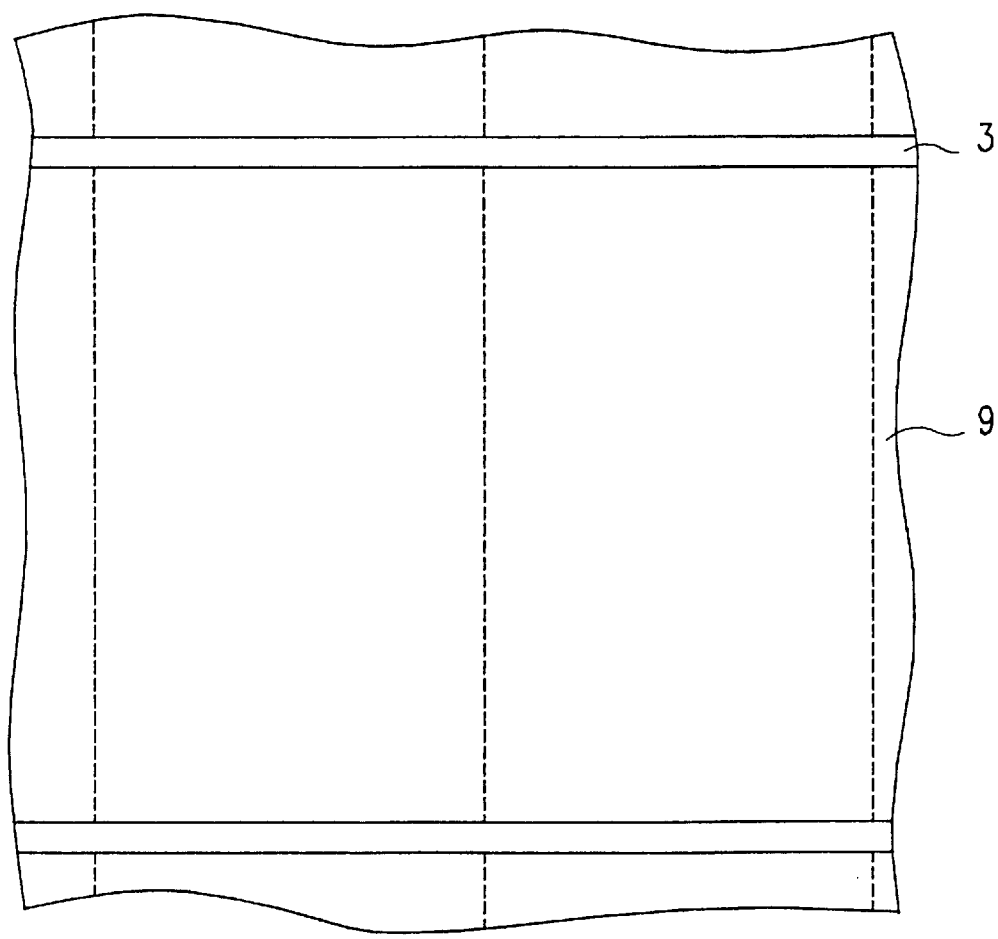
FIG. 16 is a plan view of a counter substrate facing the device-formed substrate of FIG. 15.
Figure 17:
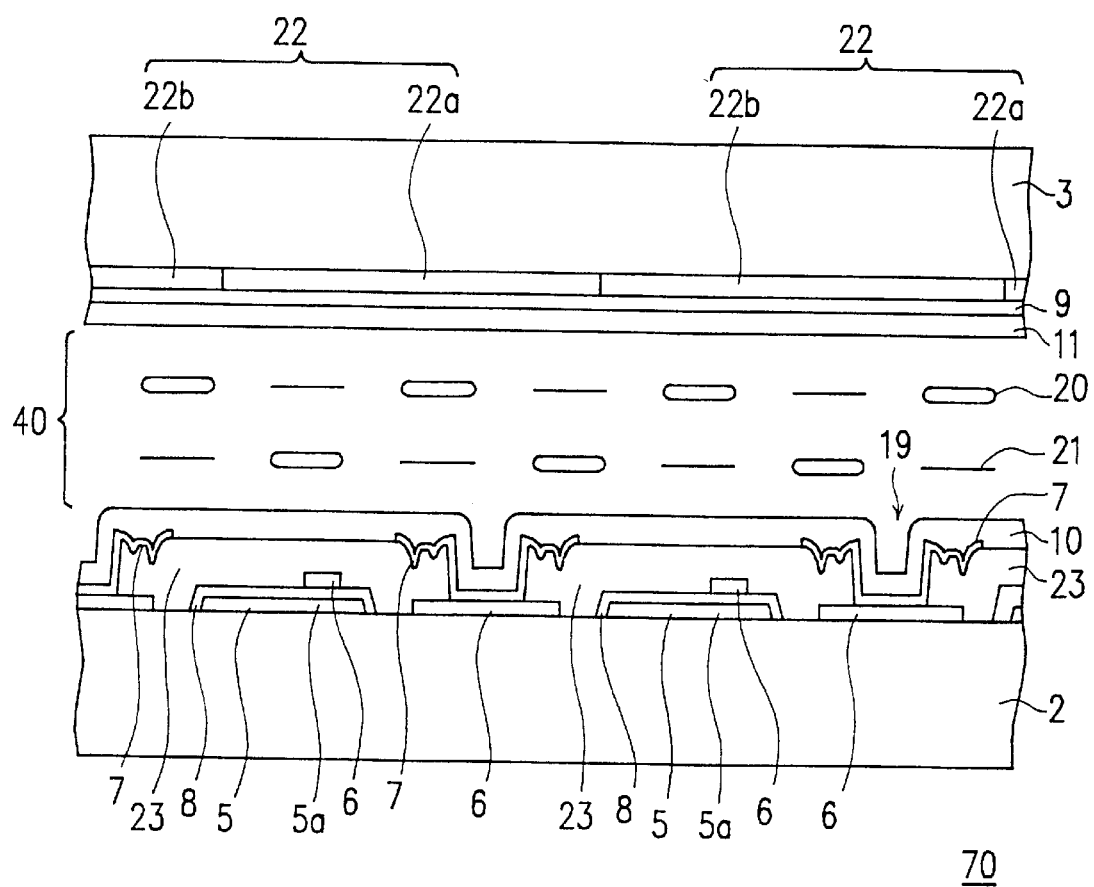
FIG. 17 is a sectional view taken along line C–C' of FIG. 15.
Figure 18:
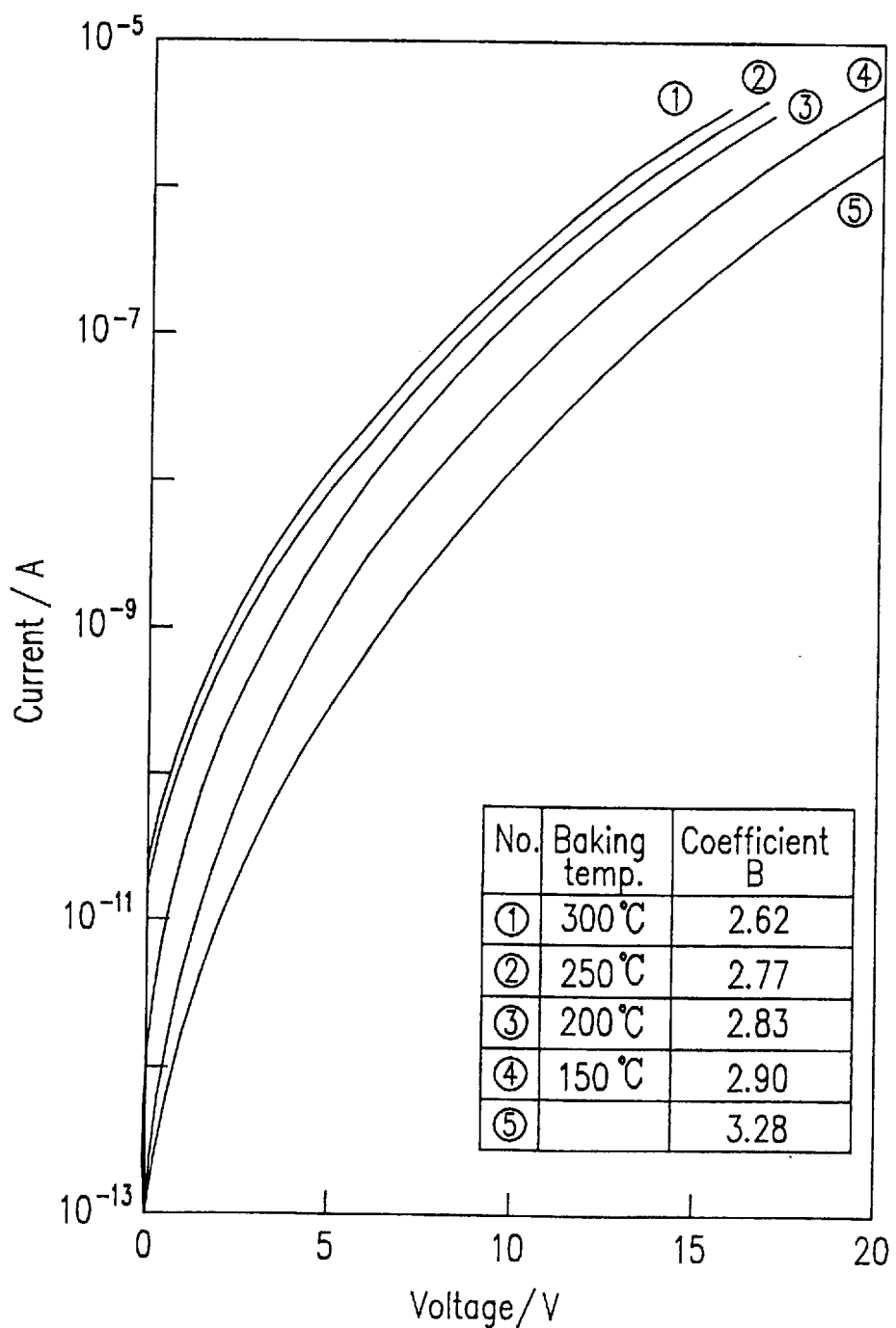
FIG. 18 is a graph illustrating degradation in the voltage/current characteristics of a MIM element due to heating.

The liquid crystal display device 100 includes pixel electrodes 7 serving as reflectors, contact holes 19, and an organic insulating layer 23 having partial uneven surfaces which are in contact with the pixel electrodes 7, as in the case of the liquid crystal display device 70 described with reference to FIG. 15. These components are omitted in FIG. 1 for simplification.

Referring to FIG. 1, each picture element of the liquid crystal display device 100 includes the pixel electrode 7, a signal line 5, and an MIM element 34 formed on a surface 2a of the device-formed substrate 2. A plurality of such signal lines 5 are actually disposed in parallel with each other and connected to respective signal line terminals (not shown, see FIG. 10) formed at an end of the device-formed substrate 2.

As shown in FIGS. 2 and 3, color microfilters 22 are formed on a surface 3a of the counter substrate 3 for color display. Each color microfilter 22 is composed of a cyan microfilter 22a and a red microfilter 22b, wherein each corresponds to one picture element. Therefore, the two picture elements corresponding to the cyan microfilter 22a and the red microfilter 22b constitute one pixel. A plurality of counter electrodes 9 are formed on the color microfilters 22 in a stripe shape in a direction perpendicular to the signal lines 5 on the device-formed substrate 2. The counter electrodes 9 are connected to respective counter terminals (not shown, see FIG. 10) formed at an end of the counter substrate 3. With the formation of the color microfilters 22 the number of signal line terminals required for this device is double the number of pixels. Specifically, for a 480 dot display, a total of 960 signal line terminals are required.

The liquid crystal display device 100 having the pixels with the above configuration is driven by applying signal waveforms between the signal line terminals and the counter terminals.

The MIM element 34 which is shown as a hatched portion in FIG. 1 is a two-terminal nonlinear element including a lower electrode 5a formed as an extension of the signal line 5, an insulating film 38 formed to cover the lower electrode 5a, and an upper electrode 6 facing the lower electrode 5a via the insulating film 38 as shown in FIG. 3.

The lower electrodes 5a are made of tantalum (Ta), for example, and the upper electrodes 6 are made of titanium (Ti), aluminum (Al), or chromium (Cr). The insulating films 38 are made of tantalum oxide ($Tao_x$), for example. The material of the upper electrodes 6 is selected so that an etchant used to pattern the upper electrodes 6 does not adversely affect the underlying signal lines 5, the lower electrodes 5a, and the anodic oxide films.

When Ta is used as the material of the signal lines 5 and the lower electrodes 5a, Ta can only be etched with some specific etchants. Accordingly, the underlying layers made of Ta will hardly be etched with an etchant used for the patterning of the upper electrodes 6. Ta is therefore often used as the material of the signal lines 5 and the lower electrodes 5a. The material of the upper electrodes 6 can be selected from a comparatively wide range of materials in consideration of the conditions for an etchant for the patterning of the upper electrodes. From the aspect of securing the symmetry in the voltage/current characteristics of the MIM elements, however, Ti or Cr is often used as the material of the upper electrodes 6 when Ta is used as the material of the lower electrodes 5a.

As will be described later with respect to the fabrication process of the MIM element, an alignment film 10 made of polyimide or the like is formed over the device-formed substrate 2 made of glass with the MIM elements 34 formed thereon, and rubbed. Likewise, an alignment film 11 is formed on the counter substrate 3 made of glass with the counter electrodes 9 formed thereon, and rubbed in the direction which varies (or is twisted) by 180°, for example, from the rubbing direction of the alignment film 10. The formation and rubbing of the alignment films 10 and 11 are performed to control the orientation of liquid crystal molecules 20 to be injected in a space between the substrates 2 and 3 after these substrates are attached to each other.

The device-formed substrate 2 and the counter substrate 3 are disposed so that the alignment films 10 and 11 formed thereon face each other, and are attached to each other via a sealing material so that the gap therebetween is kept at about 10 $\mu$m. Liquid crystal material is injected into the space between the device-formed substrate 2 and the counter substrate 3 and sealed to form the guest-host liquid crystal layer 40 and thus form a liquid crystal cell.

In the liquid crystal display device 100, the pixel electrodes 7 serve as reflectors. Al can be used as the material for such pixel electrodes 7 which serve as reflectors.

As shown in FIG. 3, the pixel electrodes 7 are formed on the organic insulating layer 23. The surfaces of the portions of the organic insulating layer 23 on which the pixel electrodes 7 are to be formed are made uneven. The uneven surfaces of the insulating layer 23 affects the pixel electrodes 7 disposed thereon, making the surface of the pixel electrodes 7 uneven. Due to the uneven surfaces, the pixel electrodes 7 serves as diffusion surfaces and reflection surfaces with high reflectance, which effectively improve the brightness and contrast of the resultant liquid crystal display device. The upper electrodes 6 of the MIM elements and the pixel electrodes 7 are electrically connected via the contact holes 19 formed through the organic insulating layer 23.

As shown in FIG. 3, the guest-host liquid crystal layer 40, containing the liquid crystal molecules 20 and dichromatic dye molecules 21, is formed between the device-formed substrate 2 and the counter substrate 3. The on/off functionality of the display is performed by applying voltages across the pixel electrodes 7 formed on the device-formed substrate 2 and the counter electrodes 9 formed on the counter substrate 3 so as to control the orientations of the liquid crystal molecules 20 and the dichromatic dye molecules 21 contained in the guest-host liquid crystal layer 40.

The dichromatic dye molecules 21 orient themselves along with the liquid crystal molecules 20. When a voltage is applied, therefore, the liquid crystal molecules 20 and the dichromatic dye molecules 21 orient themselves in a direction substantially perpendicular to the surfaces of the substrates 2 and 3. This allows light incident on the counter substrate 3 to pass through the guest-host liquid crystal layer 40 without being absorbed by the dichromatic dye molecules 21. The light is then reflected by the pixel electrodes 7 serving as reflectors, passes again through the guest-host liquid crystal layer 40, and exits from the counter substrate 3. On the contrary, when no voltage is applied, the liquid crystal molecules 20 and dichromatic dye molecules 21 are arranged randomly in the guest-host liquid crystal layer 40. The incident light is therefore blocked by being absorbed by the dichromatic dye molecules.

Thus, a bright display (white display) is obtained when incident light passes through the liquid crystal layer 40, while a dark display (black display) is obtained when incident light is blocked. Since no polarizing plate is used, a bright display screen is obtained.

In this example, the liquid crystal cell of the liquid crystal display device 100 is designed so that the ratio of the capacitance of the MIM element 34 to the capacitance of the guest-host liquid crystal layer 40 formed between the substrates 2 and 3 is substantially 1:10. The capacitance of the MIM element 34 is determined depending on the thickness of the insulating film 38 and the size (area) of the upper electrode 6. In order to satisfy the above capacitance ratio, the thickness of the insulating film 38 and the size of the upper electrode 6 are typically set at about 600 Å and 4 $\mu$m×7 $\mu$m, respectively.

Figure 13:
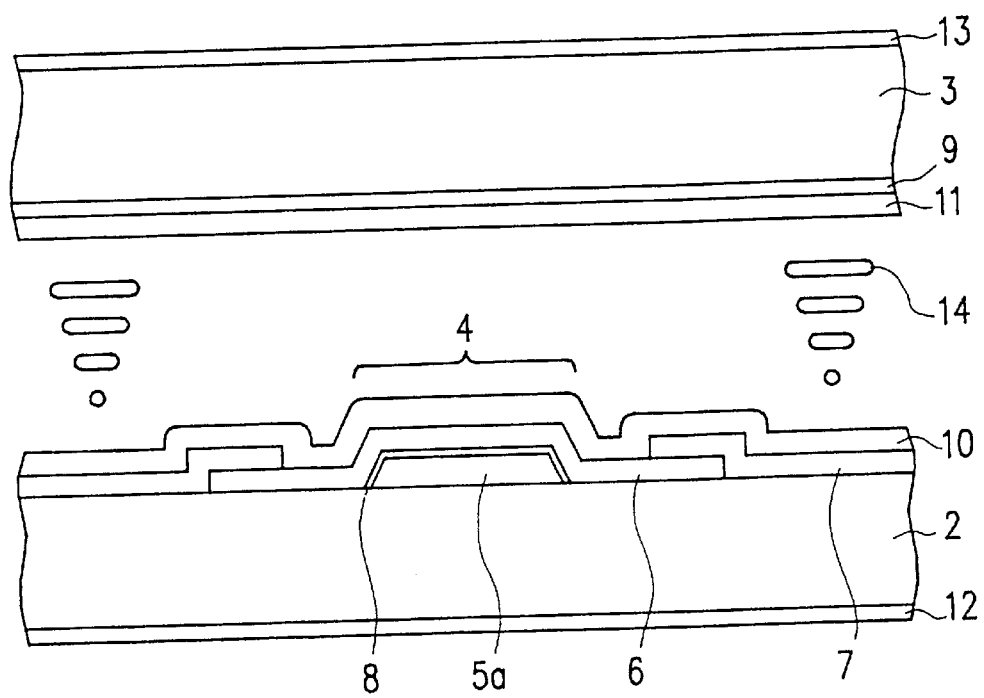
FIG. 13 is a sectional view taken along line B–B' of FIG. 11.
Figure 14A:
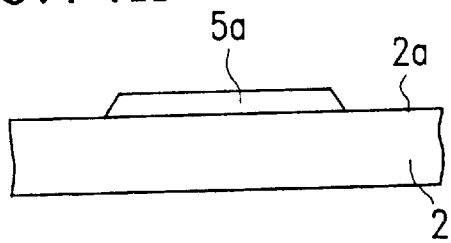
FIGS. 14A to 14E are sectional views illustrating the steps of fabricating the conventional two-terminal nonlinear element.
Figure 14E:
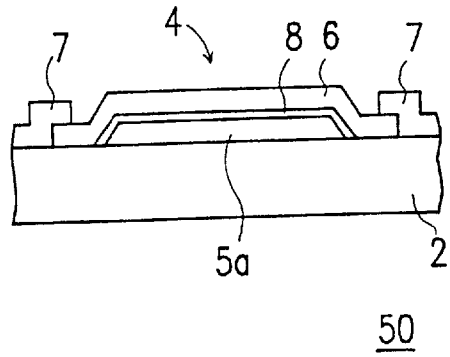
Figure 14B:
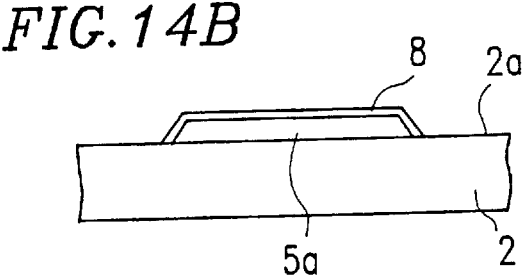
Figure 14C:
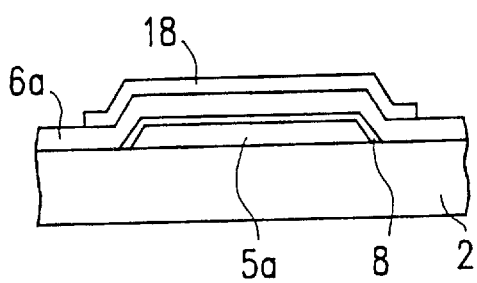
Figure 14D:
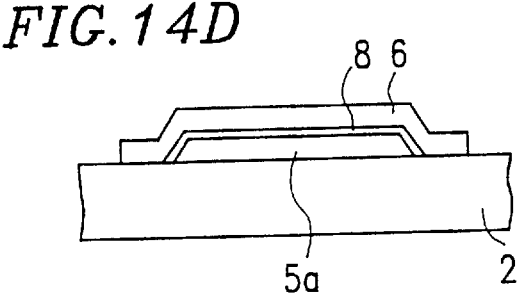

In the conventional MIM element 4 of FIG. 13, not only the portion of the insulating film 8 formed on the top flat surface of the lower electrode 5a, but also the peripheral portion thereof formed on the periphery of the lower electrode 5a are used to constitute the MIM element. Accordingly, the area of the portion actually serving as the switching element is represented by the product of the width of the lower electrode 5a and the width of the upper electrode 6. This means that, in the case where a part of the signal line 5, i.e., the extension of the signal line 5, is used as the lower electrode of the MIM element, the width of the extension of the signal line 5 directly affects the capacitance of the MIM element 4.

On the contrary, according to the MIM element 34 of Example 1 of the liquid crystal display device 100, a portion 38b (see FIGS. 4E and 4F) of the insulating film 38 located on the periphery of the lower electrode 5a is thickened, so that the portion 38b does not constitute the MIM element 34. The width of the lower electrode 5a is therefore no longer a factor of the determination of the capacitance of the MIM element 34.

The upper electrode 6 to be formed over the lower electrode 5a via a portion 38a (see FIGS. 4E and 4F) of the insulating film 38 may be displaced to some extent with respect to the pattern of the lower electrodes 5a due to limited precision of a stepper at light exposure. The width of the lower electrode 5a as the extension of the signal line 5 is therefore preferably made large so that the upper electrode 6 is located over the lower electrode 5a even when the upper electrode 6 is laterally displaced.

In this example, the width of the lower electrode 5a, which is a part of the signal line 5, is set to be 8 $\mu$m in consideration of the size of the upper electrode 6 (4 $\mu$m).

The fabrication process of the MIM element 34 of this example of the liquid crystal display device 100 will be described with reference to FIGS. 4A to 4G. FIGS. 4A to 4G are sectional views of the device-formed substrate 2 taken along line E–E' of FIG. 1.

Figure 4A:
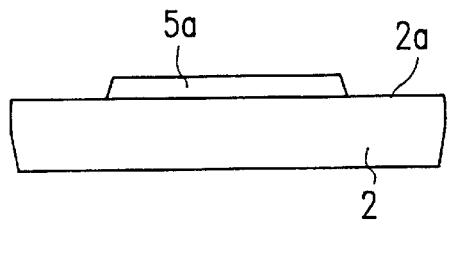
FIGS. 4A to 4G are sectional views illustrating the steps of fabricating the two-terminal nonlinear element of Example 1.

A Ta thin film, for example, is first former on the surface 2a of the device-formed substrate 2 made of glass. The Ta thin film is then patterned into a predetermined shape by photolithography to form the signal lines 5 each having a plurality of extensions as the lower electrodes 5a. In FIG. 4A, only one lower electrode 5a formed on the surface 2a of the device-formed substrate 2 is shown.

The device-formed substrate 2 may be made of silica glass, borosilicate glass, soda-lime glass, or the like. In this example, Corning #7059 fusion pyrex glass is used.

The Ta thin film is formed by DC sputtering using a sintered TaN body containing 2 to 10 mol % of nitrogen as a target and argon as a sputtering gas. The sputtering conditions are typically as follows: the argon flow rate is 100 sccm, the sputtering gas pressure 0.40 Pa, and the DC power 2.6 W/cm$^2$. The substrate is heated at 100° C. for three minutes. The substrate conveying speed is 100 mm/minute, and the distance between the substrate and the target is 77 mm. With these sputtering conditions, the Ta thin film with a thickness of 3000 Å is obtained.

An insulating base coat film made of tantalum pentaoxide may be formed on the surface 2a of the device-formed substrate 2 prior to the formation of the Ta thin film. Such a base coat film can protect the Ta thin film from being polluted with impurities entering from the device-formed substrate 2, and thus a MIM element with good characteristics can be obtained.

Instead of photolithography, the Ta thin film may be patterned by dry etching using CF$_4$ and O$_2$, for example. By this patterning, the signal lines 5 and the extensions of the signal lines 5 which are to be the lower electrodes 5a are formed. Simultaneously, signal line terminals and lines for connecting the signal lines 5 to the signal line terminals may also be patterned.

Good size precision at finishing can be obtained by using the dry etching for the patterning of the signal lines 5 and the lower electrodes 5a. As described above, however, the capacitance of the MIM element 34 of this example is determined depending on the thickness of the insulating film 38 formed by anodization and the area of the upper electrode 6. Therefor, the size precision of the lower electrode 5a does not substantially influence the capacitance of the MIM element 34. Accordingly, dry etching is not necessarily required for the pattering of the Ta thin film to form the lower electrode 5a, but other less-precise etching methods may be used for the formation of the signal lines 5 and the lower electrodes 5a. For example, wet etching using hydrofluoric nitric acid and the like may be employed for the patterning of the Ta thin film.

Figure 4E:
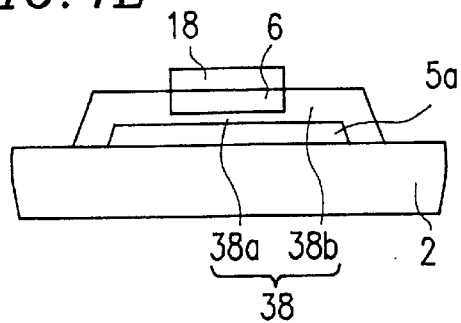
Figure 4B:
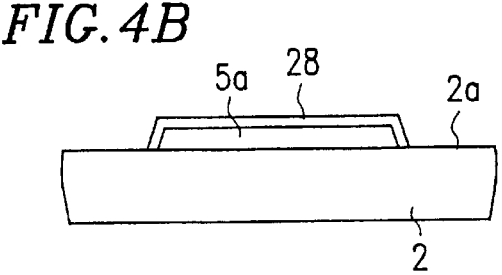

Thereafter, as shown in FIG. 4B, an anodization film 28 is formed to cover the signal lines 5 and the lower electrodes 5a by anodizing the surface of the signal lines 5 and the lower electrodes 5a. The anodization film 28 in this example is made of tantalum oxide ($TaO_x$).

Figure 5A:
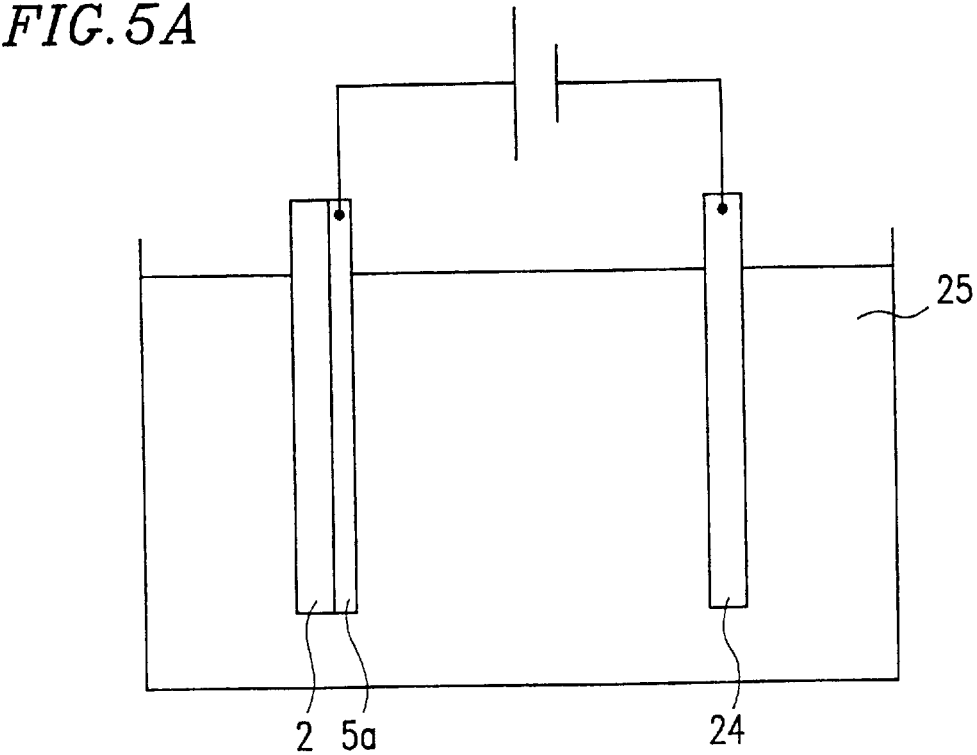
FIG. 5A schematically illustrates an apparatus used at an anodic oxidation step in the fabrication or the two-terminal nonlinear element of Example 1.

FIG. 5A is an example of an apparatus for the anodization. The device-formed substrate 2, which has the signal lines 5 and the lower electrodes 5a formed thereon, is immersed in an electrolyte 25 together with a counter electrode plate 24 (for example, a platinum plate). A predetermined formation voltage V is then applied across the device-formed substrate 2 and the counter electrode plate 24 to initiate a formation current flow I therebetween. The insulating film 28 is thus formed on the surface of the signal line 5 and the lower electrode 5a of the device-formed substrate 2, as shown in FIG. 4B.

Figure 5B:
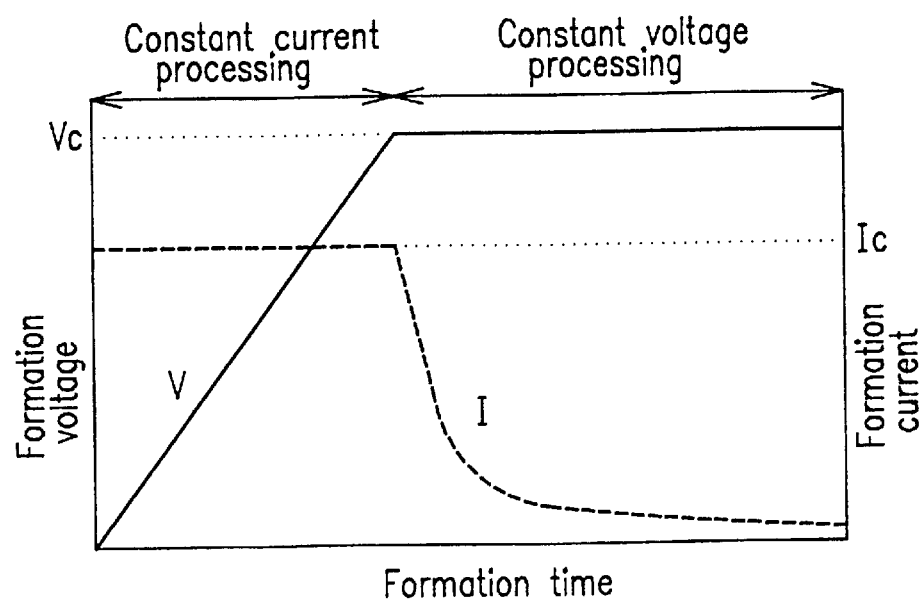
FIG. 5B is a graph illustrating the formation voltage/formation current characteristics at the anodio oxidation step.

In this anodization, the applied formation voltage V and the resultant formation current I vary with the progress of the anodization, i.e., the formation time, as shown in FIG. 5B. That is, during the initial period of the anodization, which is hereinbelow referred to as the "constant current processing period", a constant current level $I_c$ flows between the device-formed substrate 2 and the counter electrode plate 24 to obtain a constant current density and thus to effect the anodization. During this constant current processing period, the formation voltage V typically increases linearly at a fixed rate as the anodization film grows with the formation time. During the subsequent period after the formation voltage V has reached a predetermined voltage level $V_c$, which is hereinbelow referred to as the "constant voltage processing period", the predetermined voltage level $V_c$ is maintained while the anodization is performed.

In the anodization of this example, a 1% ammonium tartrate solution, for example, is used as the electrolyte 25. The temperature of the electrolyte 25 is 25° C. and the constant voltage level $V_c$ in the constant voltage processing period is 31 V. Further, the current density at the constant current level $I_c$ in the constant current processing period is 0.18 $mA/cm^2$ for the area to be anodically oxidized. Under these conditions, the anodization film 28 with a thickness of 600 Å can be obtained Thereafter, as shown in FIG. 4C, a thin metal film 6a made of Ti, for example, is formed to a thickness of 3000 Å, for example, covering the anodization film 28. A photosensitive resin layer 18 serving as a resist is then formed on the metal thin film 6a, exposed to light, and developed to obtain a pattern corresponding to the upper electrodes 6.

Figure 4F:
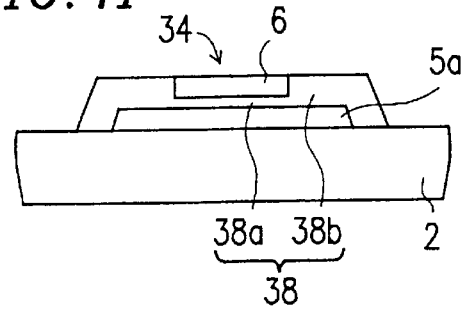
Figure 4C:
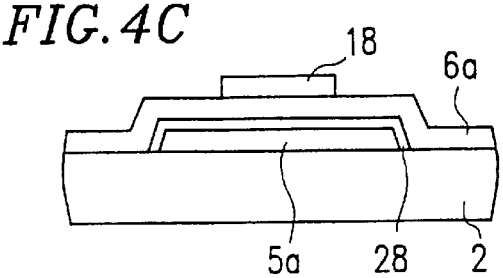
Figure 4G:
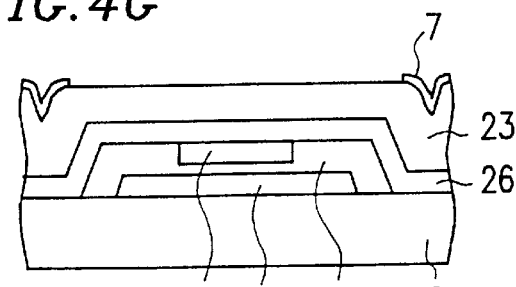
Figure 4D:
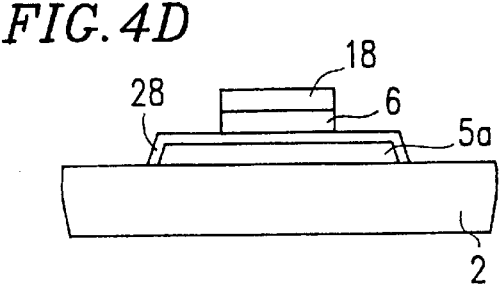

As shown in FIG. 4D, the portions of the metal thin film 6a which are not covered with the pattern of the photosensitive resin layer 18 are etched to be removed, so as to form the upper electrodes 6 with a predetermined shape. Specifically, the upper electrodes 6 are formed so that they are located over the respective lower electrodes 5a via the anodization films 28. The photosensitive resin layer 18 serving as the resist is not removed at the completion of this etching, but remains on each upper electrode 6.

The resultant device-formed substrate 2 with the photosensitive resin layer 18 remaining on each upper electrode 6 is immersed in the electrolyte again to perform a second anodization. In the second anodization, no anodization occurs on the portion covered with the upper electrode 6 and the photosensitive resin layer (resist) 18. However, the uncovered portion of the anodization film 28 exposed to the electrolyte is further thickened by this anodization. As a result, as shown in FIG. 4E, the anodization film (i.e., an insulating film) 38 obtained after the second anodization has the portion 38a which is located directly under the upper electrode 6 and has a thickness obtained by the first anodization (600 Å in this example) and the portion 38b which surrounds the portion 38a and has an increased thickness.

The thickness of the anodization film is in proportion to the level of the applied formation voltage V. Accordingly, the constant voltage level $V_c$ of the formation voltage V in the constant voltage processing period of the second anodization must be higher than that in the first anodization. Specifically, in this example, the constant voltage level $V_c$ in the second anodization is set at 160 V, so as to thicken the portion 38b of the insulating film 38 located on the periphery of the lower electrode 5a to 3000 Å.

In general, during the anodization, the temperature of the substrates to be processed rises due to joule heating generated by this reaction. However, by taking appropriate measures such as agitating the electrolyte 25, the temperature can be sufficiently lowered. Thus, the portion 38b of the insulating film 38 located on the periphery of the lower electrode 5a can be thickened under a low temperature and not a high temperature which may cause degradation of the MIM element 34.

Thereafter, the photosensitive resin layer (resist) 18 on each upper electrode 6 is removed, as shown in FIG. 4F. Thus, the two-terminal nonlinear element (MIM element) 34 having the MIM structure composed of the lower electrode 5a, the portion 38a of the insulating film 38, and the upper electrode 6 is obtained.

In the liquid crystal display device 100, the pixel electrode 7 also serves as a reflector for reflecting light which enters from the counter substrate and passes through the liquid crystal layer 40. That is, the reflector is formed inside the liquid crystal cell. Therefore, after the formation of the MIM elements 34, a thin metal film 26 made of Ti, for example, for connecting the pixel electrodes 7 (serving as reflectors) and the MIM elements 34 is formed over the resultant device-formed substrate 2 and patterned into a predetermined shape. The organic insulating layer 23 with the uneven surfaces is then formed on the metal thin film 26, as shown in FIG. 4G. The contact holes 19 are formed through the organic insulating layer 23 (see FIG. 3). Then, the pixel electrodes 7 made of Al, for example, are formed on the organic insulating layer 23.

The alignment film 10, as illustrated in FIG. 3, is formed over the resultant device-formed substrate 2 with the MIM elements 34 and the pixel electrodes 7 serving as reflectors formed thereon, and rubbed. The alignment film 11 is formed over the counter substrate 3 and also rubbed. The device-formed substrate 2 and the counter substrate 3 are then attached to each other with a sealing material therebetween. The guest-host liquid crystal material containing the liquid crystal molecules 20 and the dichromatic dye molecules 21 is then injected into a space between the substrates 2 and 3 to form the liquid crystal layer 40. Then, the cell is sealed. Thus, the liquid crystal cell constituting the liquid crystal display device 100 is completed.

(EXAMPLE 2)

A liquid crystal display device 200 including two-terminal nonlinear elements of Example 2 according to the present invention will be described with reference to FIGS. 6 to 9.

In Example 1, an extension of the signal line 5 is used as the lower electrode 5a of each MIM element 34. In this example, part of the signal line 5 is itself used as the lower electrode with each MIM element formed directly on the signal line 5.

The reason why an extension of the signal line 5 is used to form the lower electrode 5a of each MIM in Example 1 is as follows.

In general, as the resistance of the signal line is larger, the delay time of a driving signal is longer. This increased delay time of the driving signal is disadvantageous in the operation of the resultant liquid crystal display device. In order to reduce the resistance of the signal line, the width of the signal line is made larger, typically on the order of several tens of micrometers. On the other hand, in order to set the capacitance ratio of the MIM element to the liquid crystal layer at an appropriate value, the width of the lower electrode must be on the order of several micrometers. Therefore, the signal line, widened to avoid the delay time of the driving signal, is too wide to be used as the lower electrode. In order to satisfy the above two requirements, a narrow extension from the signal line is formed to be used as the lower electrode of each MIM element.

In this example, however, the periphery of the lower electrode is not used to constitute the MIM element. The width of the lower electrode is, therefore, not a major restraint in the design of the capacitance of the MIM element, but can be any value larger than the size of the upper electrode.

This eliminates the necessity of forming an extension of the signal line for the lower electrode; instead, part of the surface portion of the signal line itself may be used as the lower electrode of each MIM element which may be formed directly on the signal line. Since it is not required to allocate part of each pixel electrode for forming the lower electrode, the aperture ratio of each pixel increases and thus a bright display screen is obtained.

In particular, in a liquid crystal display device used for a portable information terminal, high-precision display with a small dot pitch is required even for the monochromic display. The MIM element of this example, which can suppress reduction of the aperture ratio, is therefore suitable for this application.

Figure 6:
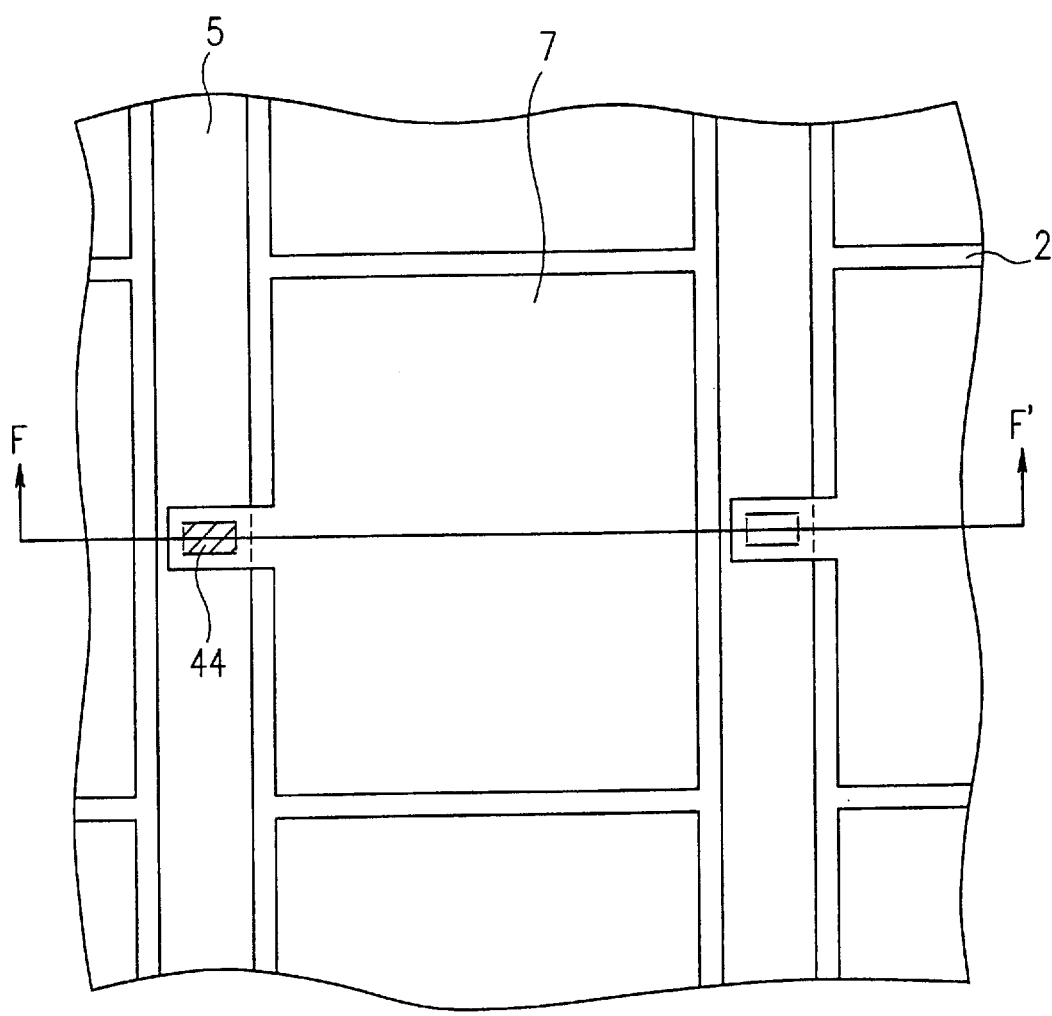
FIG. 6 is a plan view of a device-formed substrate on which a two-terminal nonlinear element of Example 2 according to the present invention is formed.
Figure 7:
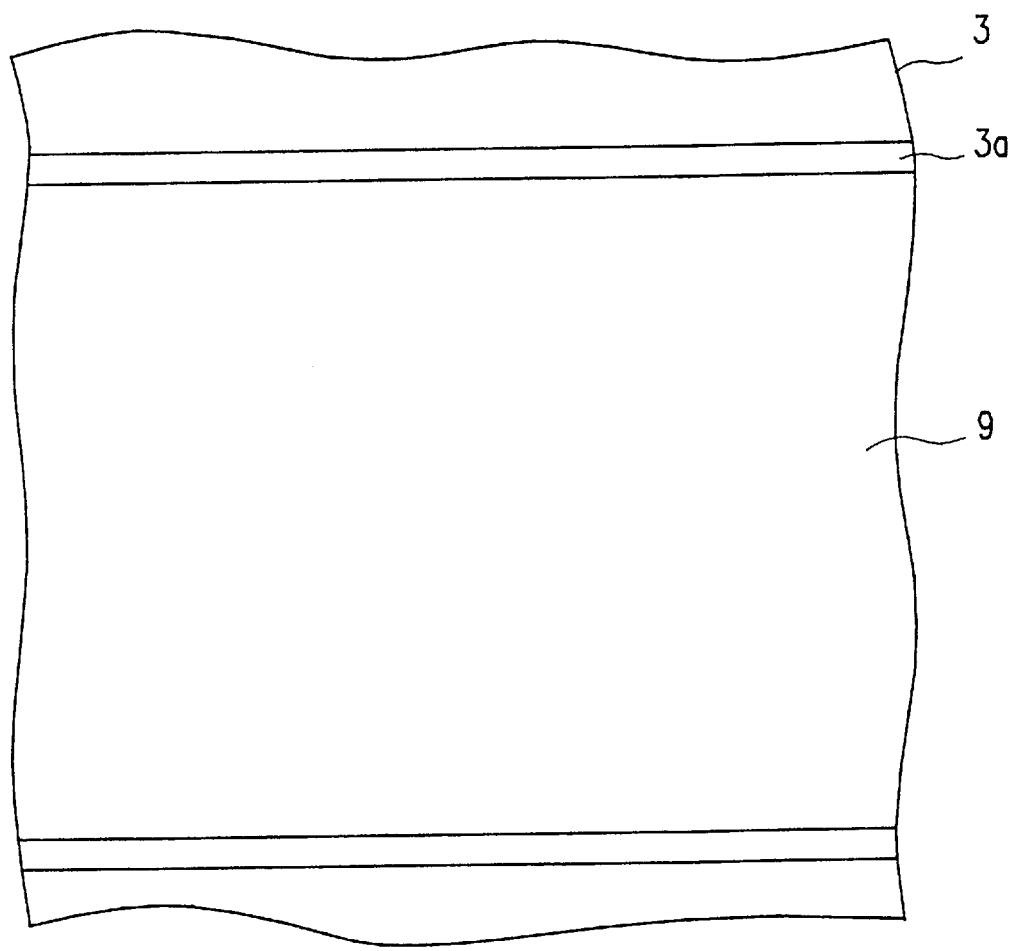
FIG. 7 is a plan view of a counter substrate facing the device-formed substrate of FIG. 6.

FIG. 6 is a plan view of one pixel formed on a device-formed substrate 2 at an arbitrary position in a display region of the liquid crystal display device 200. FIG. 7 is a plan view of the portion of a counter substrate 3 corresponding to the portion of the device-formed substrate 2 shown in FIG. 6 and FIG. 8 is a sectional view of the liquid crystal display device 200, taken along line F–F' of FIG. 6.

The liquid crystal display device 200 in this example has the H-VGA pixel arrangement using a TN optical system for monochromic display. The plan view of the entire liquid crystal display device 200 is basically the same as that of the conventional liquid crystal display device 50 shown in FIG. 10. The description thereof is therefore omitted here. The components of the liquid crystal display device 200 corresponding to those of the liquid crystal display devices described above are denoted by the same reference numerals.

Referring to FIG. 6, each pixel of the liquid crystal display device 200 includes a pixel electrode 7, a signal line 5, and a MIM element 44 formed on a surface 2a of the device-formed substrate 2. A plurality of such signal lines 5 are actually disposed in parallel with each other and connected to respective signal line terminals (not shown, see FIG. 10) formed at an end of the device-formed substrate 2.

As shown in FIGS. 7 and 8, a plurality of counter electrodes 9 are formed on a surface 3a of the counter substrate 3 in a stripe shape in the direction perpendicular to the signal lines 5 on the device-formed substrate 2. The counter electrodes 9 are connected to respective counter terminals (not shown, see FIG. 10) formed at an end of the counter substrate 3.

The liquid crystal display device 200 with the above configuration is driven by applying a signal having waveforms to the signal line terminals and the counter terminals.

The MIM element 44, which is shown as a hatched portion in FIG. 6, is a two-terminal nonlinear element including a lower electrode as part of the signal line 5, an insulating film 38 which covers the part of the signal line 5 corresponding to the lower electrode, and an upper electrode 6 facing the lower electrode (signal line) 5 via the insulating film 38 as shown in FIG. 8. With this configuration, since it is not required to allocate part of each pixel electrode for the formation of the lower electrode, unlike the configuration using an extension of the signal line as the lower electrode, the aperture ratio of the resultant liquid crystal display device is improved.

The signal lines 5 are made of tantalum (Ta), for example, and the upper electrodes 6 are made of titanium (Ti), aluminum (Al), or chromium (Cr). The insulating films 38 are made of tantalum oxide ($TaO_x$), for example.

As will be described later with respect to the fabrication process of the MIM element, an alignment film 10 made of polyimide or the like is formed on the device-formed substrate 2 made of glass with the MIM elements 44 formed thereon, and rubbed. Likewise, an alignment film 11 is formed on the counter substrate 3 made of glass with the counter electrodes 9 formed thereon, and rubbed in the direction twisted by 90°, for example, from the rubbing direction of the alignment film 10. The formation and rubbing of the alignment films 10 and 11 are performed to control the orientation of the liquid crystal molecules 14 to be injected in a space between the substrates 2 and 3 after these substrates are attached to each other.

The device-formed substrate 2 and the counter substrate 3 are disposed so that the alignment films 10 and 11 formed thereon face each other, and are attached to each other via a sealing material so that the gap therebetween is kept at about 10 $\mu$m. The liquid crystal molecules 14 are then injected into the space between the device-formed substrate 2 and the counter substrate 3 and sealed to form a liquid crystal cell. Polarizing plates 12 and 13 are disposed on the outer surfaces of the liquid crystal cell, so that the polarizing axes of the polarizing plates 12 and 13 are displaced from each other by 90°. Thus, the liquid crystal display device 200 with the MIM elements 44 for respective pixels is completed.

The fabrication process of the MIM element 44 of this example of the liquid crystal display device 200 will be described with reference to FIGS. 9A to 9G.

Figure 9A:
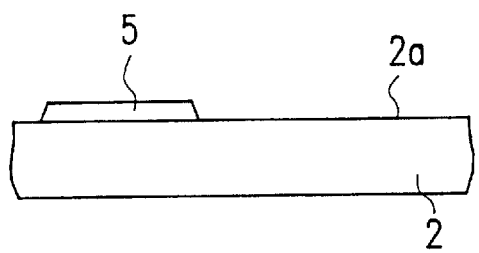
FIGS. 9A to 9G are sectional views illustrating the steps of fabricating the two-terminal nonlinear element of Example 2.

A thin film made of a material for the signal lines 5, e.g., a Ta thin film is first formed on the surface 2a of the device-formed substrate 2 made of glass by sputtering. The Ta thin film is then patterned into a predetermined shape by photolithography to form the signal lines 5 as shown in FIG. 9A.

The device-formed substrate 2 may be made of silica glass, borosilicate glass, soda-lime glass, or the like. In this example, Corning #7059 fusion Pyrex glass is used.

The Ta thin film is formed by DC sputtering using sintered TaN containing 2 to 10 mol % of nitrogen as a target and argon as a sputtering gas. The sputtering conditions are typically as follows: the argon flow rate is 100 sccm, the sputtering gas pressure 0.4 Pa, and the DC power 2.6 W/cm². The substrate is heated at 100° C. for three minutes. The substrate conveying speed is 100 mm/minute, and the distance between the substrate and the target is 77 mm. With these sputtering conditions, the Ta thin film with a thickness of 3000 Å is obtained.

Prior to the formation of the Ta thin film, an insulating base coat film made of tantalum pentaoxide and the like may be formed on the surface 2a of the device-formed substrate 2. Such a base coat film can protect the Ta thin film from being polluted with impurities entering from the device-formed substrate 2, and thus a MIM element with good characteristics can be obtained.

The Ta thin film may be patterned by dry etching using $CF_4$ and $O_2$, for example. By this patterning, the signal lines 5 are formed. Simultaneously, signal line terminals and lines for connecting the signal lines 5 to the signal line terminals may also be patterned.

Good size precision at finishing can be obtained by using the dry etching for the pattering of the signal lines S. The dry etching is, however, not necessarily required for the patterning of the signal lines 5 due to the reason described in Example 1. Other etching methods, e.g., wet etching using a mixture of hydrofluoric acid and nitric acid or the like may be used for the patterning of the Ta thin film.

Figure 9E:
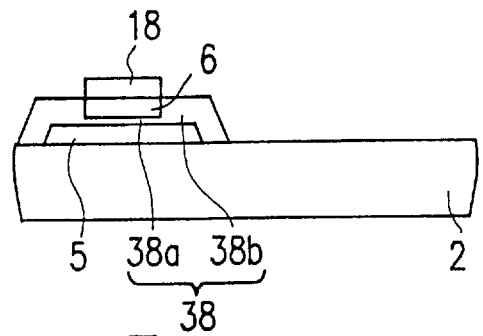
Figure 9B:
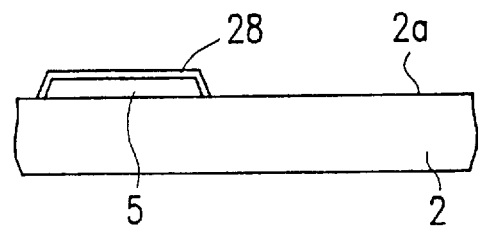

Thereafter, as shown in FIG. 9B, an anodization film 28 is formed covering each signal line 5 of the patterned Ta thin film by anodization. The anodization film 28 in this example is made of tantalum oxide ($TaO_x$).

In this example, a 1% ammonium tartrate solution, for example, is used as an electrolyte for the anodization. The temperature of the electrolyte is 25° C. The constant voltage level $V_c$ in the constant voltage processing period is 31 V and the current density at the constant current level $I_c$ in the constant current processing period is 0.18 $mA/cm^2$ for the area to be anodically oxidized. Under these conditions, the anodization film 28 with a thickness of 600 Å can be obtained.

Figure 9F:
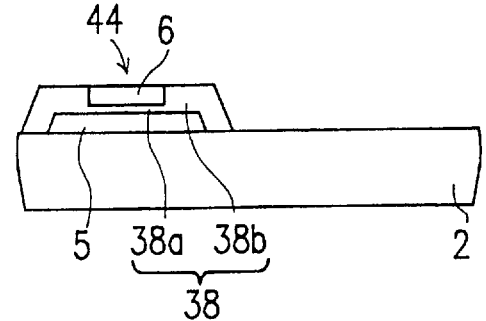
Figure 9C:
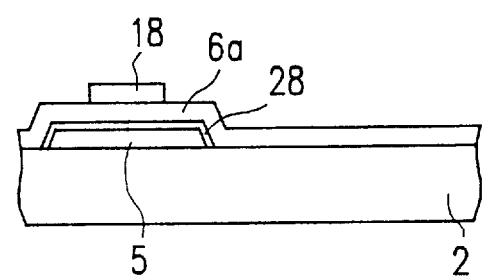

Thereafter, as shown in FIG. 9C, a thin metal film 6a made of Ti, for example, is formed on the device-formed substrate 2 covering the anodization films 28 to a thickness of 3000 Å, for example. A photosensitive resin layer 18 serving as a resist is formed on the metal thin film 6a, exposed to light, and developed to obtain a pattern corresponding to the upper electrodes 6.

Figure 9G:
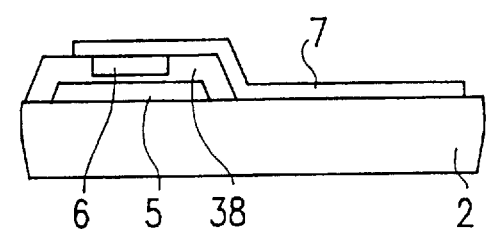
Figure 9D:
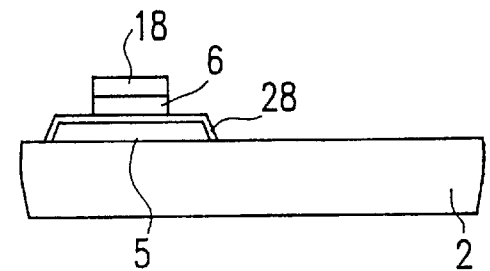
Figure 12:
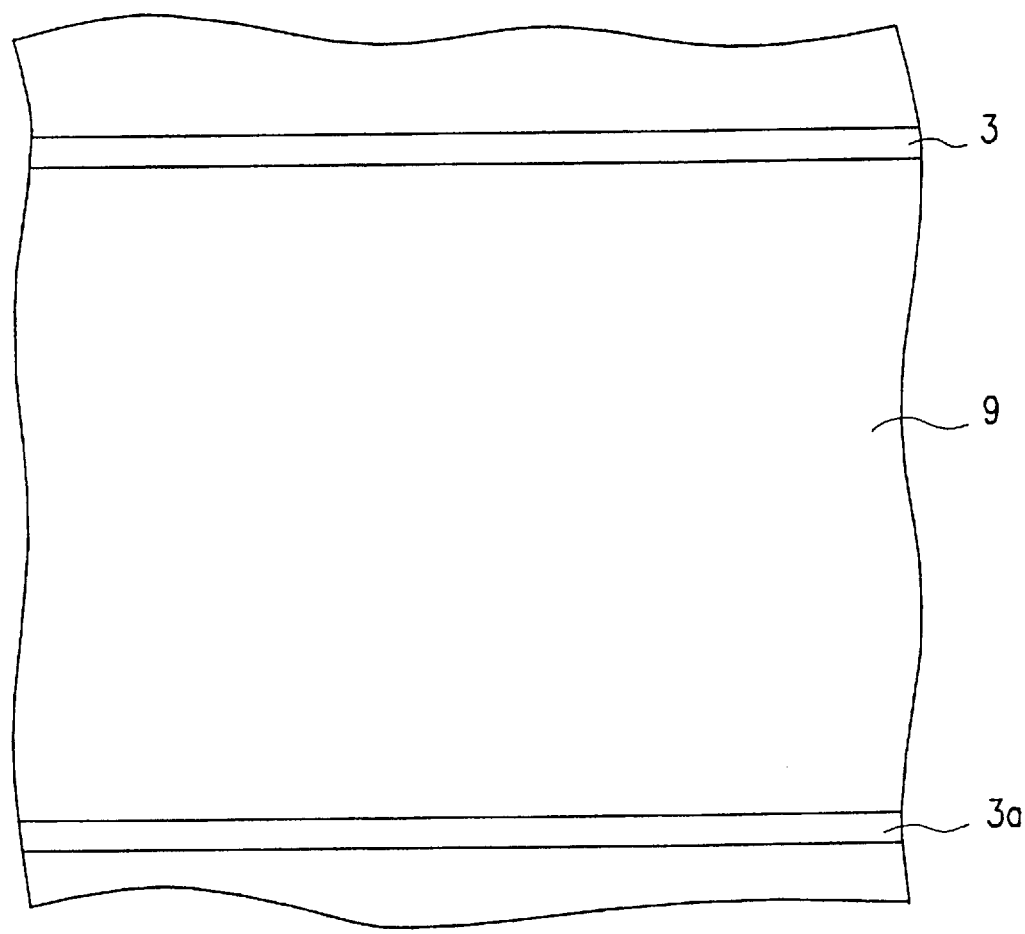
FIG. 12 is a plan view of a counter substrate facing the device-formed substrate of FIG. 11.

As shown in FIG. 9D, the portions of the metal thin film 6a which are not covered with the pattern of the photosensitive resin layer 18 are removed by etching to form the upper electrodes 6 with a predetermined shape. Specifically, the upper electrodes 6 are formed so that they face the respective signal lines 5 via the anodization films 28. The photosensitive resin layer 18 serving as a resist is not removed at the completion of this etching, but remains on each upper electrode 6.

The resultant device-formed substrate 2 with the photosensitive resin layer 18 remaining on each upper electrode 6 is immersed in the electrolyte again to perform a second anodization. In the second anodization, no anodization occurs on the portion of each anodic oxide film 28 covered with the upper electrode 6 and the photosensitive resin layer (resist) 18. However, the uncovered portion of the anodic oxide film 28 exposed to the electrolyte is further thickened by this anodization. As a result, as shown in FIG. 9E, each anodic oxide film (insulating film) 38 obtained after the second anodization has the portion 38a which is located directly under the upper electrode 6 and has a thickness obtained by the first anodization (600 Å in this example) and the portion 38b which surrounds the portion 38a and has an increased thickness.

The thickness of an insulating film (anodic oxide film) formed by anodization is proportional to the level of the applied formation voltage V. Accordingly, the is constant voltage level $V_c$ of the formation voltage V in the constant voltage processing period of the second anodization must be higher than that in the first anodization. Specifically, in this example, the constant voltage level $V_c$ in the second anodization is set at 160 V, so as to thicken the portion 38b of the insulating film 38 located on the periphery of the signal line (lower electrode) 5 to 3000 Å.

In general, in the anodization, the temperature of the substrate to be processed rises due to joule heating generated by this reaction. However, by taking appropriate measures such as agitating the electrolyte 25, the temperature can be sufficiently lowered. Thus, the portion 38b of the insulating film 38 located on the periphery of the signal line (lower electrode) 5 can be thickened under a low temperature and not a high temperature which may cause degradation of the MIM element 44.

Thereafter, the photosensitive resin layer (resist) 18 on each upper electrode 6 is removed. Thus, the two-terminal nonlinear element (MIM element) 44 having the MIM structure composed of the lower electrode as part of the signal line 5, the portion 38a of the insulating film 38, and the upper electrode 6 as shown in FIG. 9F is obtained.

A film made of a transparent conductive material such as ITO (not shown) is then formed on the resultant device-formed substrate 2 covering the upper electrodes 6, and patterned into a predetermined shape by photolithography to form the pixel electrodes 7, as shown in FIG. 9G. The pixel electrodes 7 are connected to the upper electrodes 6.

The alignment film 10 is formed on the resultant device-formed substrate 2 with the MIM elements 44 and the pixel electrodes 7 formed thereon, and rubbed. The alignment film 11 is formed on the counter substrate 3 and also rubbed. The device-formed substrate 2 and the counter substrate 3 are then attached to each other with a sealing material therebetween. The liquid crystal molecules 14 are injected into a space between the substrates 2 and 3 and sealed. Thus, the liquid crystal cell constituting the liquid crystal display device 200 is completed. The polarizing plates 12 and 13 are disposed on the outer surfaces, of the device-formed substrate 2 and the counter substrate 3 opposite to the surfaces 2a and 3a with the alignment films 10 and 11 formed thereon, respectively, so that the polarizing axes each other by 90°. Thus, the liquid crystal display device 200 with the MIM elements 44 for the respective pixels is completed.

In the MIM element 44 of this example, since each insulating film 38 is thick at its periphery corresponding to the edges of the underlying signal line 5, large steps are formed at the periphery. In the formation of the ITO film over the MIM element 44 to form the pixel electrode 7, the step coverage of the ITO film may not be satisfactory. That is, such steps may not be covered with the ITO film satisfactorily. In such a case, disconnection may occur at the connection between the pixel electrode 7 and the upper electrode 6. In order to overcome this problem, another metal thin film may be formed on the upper electrode 6 prior to the formation of the ITO film to improve the step coverage and adhesion of the ITO film.

The above step of forming another metal thin film is not required when an appropriate material with good adhesion and free from disconnection is used. In such a case, no additional photomask is required for the patterning of the components of the MIM elements into respective predetermined shapes, other than the three photomasks, that is, the photomask used to form the signal lines (lower electrodes) 5 by patterning the Ta thin film, the photomask used to form the upper electrodes 6 by patterning the Ti thin film 6a, and the photomask used to form the pixel electrodes 7 by patterning the ITO film. Use of only three photomasks saves production cost.

Thus, according to the two-terminal nonlinear element (MIM element) of the present invention having the MIM structure composed of the lower electrode, the insulating film, and the upper electrode, the portion of the insulating film located on the periphery of the lower electrode, where the insulation tends to be easily broken, can be thickened by two steps of anodization and the step of forming the upper electrode. The thickened portion of the insulating film is thus prevented from insulation breakdown, thereby improving the element's resistance against static electricity. Thus, point defects caused by insulation breakdown of the two-terminal nonlinear element due to static electricity generated during the fabrication of the liquid crystal display device can be reduced.

The above partial thickening of the insulating film constituting the MIM structure of the two-terminal nonlinear element can be performed under low temperature conditions, not high temperature conditions which may cause a degradation of the resultant MIM element characteristics. Thus, the reduction of point defects can be realized without lowering the display quality due to degraded characteristics of the MIM element, i.e., without lowering the production yield. Moreover, since no high-temperature processing is involved, the present invention is also applicable to a substrate made of a plastic material and the like having a low heat resistance.

The above thickened portion of the insulating film located on the periphery of the lower electrode is not used to constitute the MIM element. The width of the lower electrode is, therefore, not a major restraint in the design of the capacitance of the MIM element, but can be any value larger than the size of the upper electrode. This eliminates the necessity of forming an extension of the signal line for the lower electrode; rather part of the surface portion of the signal line can be used as the lower electrode of each MIM element formed directly on the signal line. Since it is not required to allocate part of each pixel electrode for forming the lower electrode, the aperture ratio increases and thus a bright display screen is obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A two-terminal nonlinear element for a liquid crystal display device comprising a pair of substrates facing each other, a liquid crystal layer interposed between the pair of substrates, and a plurality of pixel electrodes formed in a matrix on a surface of at least one of the substrates so as to face the other substrate, wherein the two-terminal nonlinear element is connected to a corresponding one of the plurality of pixel electrodes and comprises:
  a lower electrode connected to a signal line formed on at least one of the substrates;
  an insulating film formed on a surface of the lower electrode; and
  an upper electrode formed to face the lower electrode via the insulating film and connected to the corresponding one of the plurality of pixel electrodes;
  wherein the capacitance of the two-terminal nonlinear element is determined by the area of the upper electrode; and
  wherein the insulating film has a first portion interposed between the upper electrode and the lower electrode and a second portion surrounding the upper electrode and having a thickness larger than that of the first portion; wherein the first and second portions of the insulating film are made of a same metal oxide produced by anodization.

2. A two-terminal nonlinear element according to claim 1, wherein a portion of the signal line serves as the lower electrode, and the two-terminal nonlinear element is formed directly on the signal line.

3. A two-terminal nonlinear element according to claim 1, wherein the insulating film having the first and second portions is formed by a plurality of anodization steps.

4. A two-terminal nonlinear element comprising: a lower electrode having a top flat portion;
  an insulating layer formed covering the lower electrode;
  an upper electrode formed to partially overlap the lower electrode with the insulating layer interposed therebetween, wherein the capacitance of the two-terminal nonlinear element is determined by the area of the upper electrode;
  wherein a thickness of the insulating layer is thinner in a portion located on the top flat portion of the lower electrode than in a portion located on a portion of the lower electrode other than the top flat portion, and wherein the top flat portion and the portion other than the top flat portion of the insulating film are made of the same metal oxide produced by anodization.

5. A method of fabricating a two-terminal nonlinear element, comprising:
  forming a lower electrode on a substrate;
  forming an upper electrode; and
  forming an insulating film between the lower electrode and the upper electrode, wherein the insulating film has a first portion having a first thickness and a second portion having a second thickness, wherein the first portion is thicker than the second portion, and wherein the capacitance of the two-terminal nonlinear element is determined by the area of the upper electrode;
  wherein the steps of forming the upper electrode and the insulating film comprise:
  forming a first insulating layer over the lower electrode;
  forming a conductive layer over the first insulating layer;
  patterning the conductive layer to a predetermined shape, wherein the patterned conductive layer forms the upper electrode; and
  forming a second insulating layer over a portion of the first insulating layer not covered by the upper electrode, wherein the first and second insulating layers collectively form the first portion of the insulating film having the first thickness and the first insulating layer located beneath the upper electrode forms the second portion of the insulating film having the second thickness.

6. The method of claim 5, wherein the step of forming a first insulating layer comprises the steps of:
  immersing the substrate having the lower electrode in an electrolyte with a counter electrode plate; and
  applying a formation voltage across the substrate and the counter electrode plate, thereby forming the first insulating layer via anodization.

7. The method of claim 5, wherein the steps of forming the second insulating layer comprises the steps of:
  protecting the conductive layer so that the second insulating layer is not formed over it; and immersing the substrate having the lower electrode, first insulating layer and the conductive layer into an electrolyte with a counter electrode plate; and applying a formation voltage across the substrate and the counter electrode plate, thereby forming the second insulating layer via anodization.

8. A method of fabricating a two-terminal nonlinear element, comprising:

forming a lower electrode on a substrate;

forming an upper electrode; and forming an insulating film between the lower electrode and the upper electrode, wherein the insulating film has a first portion having a first thickness and a second portion having a second thickness, wherein the first portion is thicker than the second portion, and wherein the capacitance of the two-terminal nonlinear element is determined by the area of the upper electrode;

forming a second insulating film over the upper electrode and the insulating film, wherein the second insulating film has at least one portion of the film having uneven surfaces; and forming a pixel electrode on the second insulating film, wherein the pixel electrode has uneven surfaces which correspond to the second insulating film and wherein the pixel electrode serves as a reflector.

9. A method for fabricating a two-terminal nonlinear element including a lower electrode, an insulating film formed covering the lower electrode, and an upper electrode formed to face the lower electrode via the insulating film, the method comprising the steps of:

forming a first conductive film on a substrate and then patterning the first conductive film to form the lower electrode;

performing a first anodization to form the insulating film on at least a portion of the lower electrode;

forming a second conductive film on the insulating film;

forming a photosensitive resin layer having a pattern corresponding to a pattern of the upper electrode on the second conductive film;

patterning the second conductive film into a predetermined shape using the photosensitive resin layer to form the upper electrode;

performing a second anodization using the pattern of the photosensitive resin layer remained on the upper electrode, to thicken a portion of the insulating film corresponding to a portion surrounding the upper electrode more than a portion of the insulating film interposed between the upper electrode and the lower electrode; and removing the photosensitive resin layer.

* * * * *